(12) United States Patent
Goldsobel et al.

(10) Patent No.: US 7,100,294 B1
(45) Date of Patent: Sep. 5, 2006

(54) METHOD OF SENSING TILT, TILT SENSOR, AND METHOD OF MANUFACTURING SAME

(75) Inventors: Norman Goldsobel, Commack, NY (US); Pascal LeMarie, Smithtown, NY (US)

(73) Assignee: Spectron Glass and Electronics, Inc, Hauppauge, NY (US)

( * ) Notice: Subject to any disclaimer, the term of this patent is extended or adjusted under 35 U.S.C. 154(b) by 0 days.

(21) Appl. No.: 11/089,187

(22) Filed: Mar. 24, 2005

(51) Int. Cl.
 *G01C 9/06* (2006.01)
(52) U.S. Cl. .............................. 33/366.21; 33/366.22
(58) Field of Classification Search ............ 33/366.21, 33/366.15, 366.18, 366.19, 366.22
 See application file for complete search history.

(56) References Cited

U.S. PATENT DOCUMENTS

| | | | |
|---|---|---|---|
| 2,711,590 A * | 6/1955 | Wilcox | 33/366.19 |
| 3,186,101 A * | 6/1965 | Wolpert | 33/366.22 |
| 4,536,967 A | 8/1985 | Beitzer | |
| 6,449,857 B1 * | 9/2002 | Anikolenko | 33/366.11 |
| 6,625,896 B1 | 9/2003 | Olson | |
| 6,634,113 B1 | 10/2003 | Almaraz et al. | |
| 6,688,013 B1 | 2/2004 | Greway | |
| 6,802,132 B1 | 10/2004 | Olson | |
| 2003/0110652 A1 * | 6/2003 | Greway | 33/366.18 |
| 2004/0016137 A1 | 1/2004 | Barsky | |

* cited by examiner

Primary Examiner—Christopher W. Fulton
(74) Attorney, Agent, or Firm—Hoffmann & Baron, LLP

(57) ABSTRACT

A method of sensing tilt includes applying an electrical signal, such as voltage, current, a constant signal, or a time-varying signal to at least one electrode of a first set of electrodes and measuring an electrical parameter using at least one electrode of a second set of electrodes. The electrodes are disposed in a conductive medium within an envelope. The electrical parameter represents tilt relative to a first axis. The electrical roles of the first and second sets of electrodes are reversed to determine tilt relative to a second axis. No more than four electrodes are used to determine tilt relative to two axes. A tilt sensor includes an envelope, conductive medium in the envelope, and four electrodes. A method of making a tilt sensor includes providing at least four electrodes, forming an envelope to receive at least a portion of the electrodes, placing a conductive medium into the envelope, and sealing the conductive medium in the envelope.

73 Claims, 28 Drawing Sheets

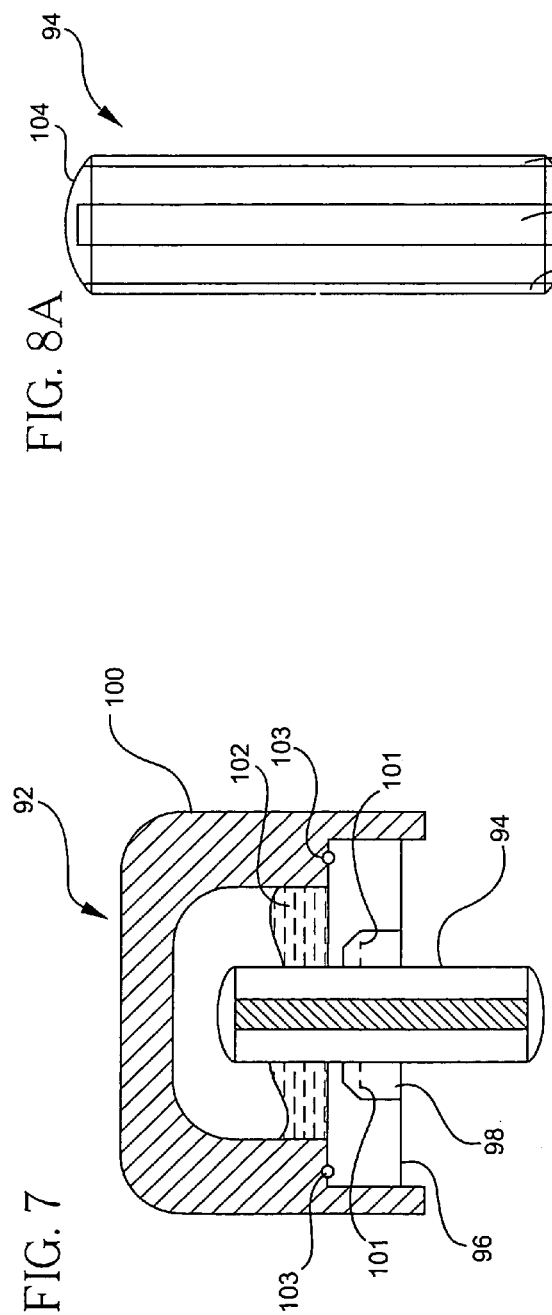
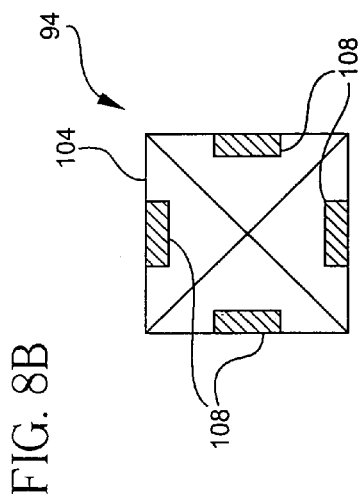
FIG. 7
FIG. 8A
FIG. 8B

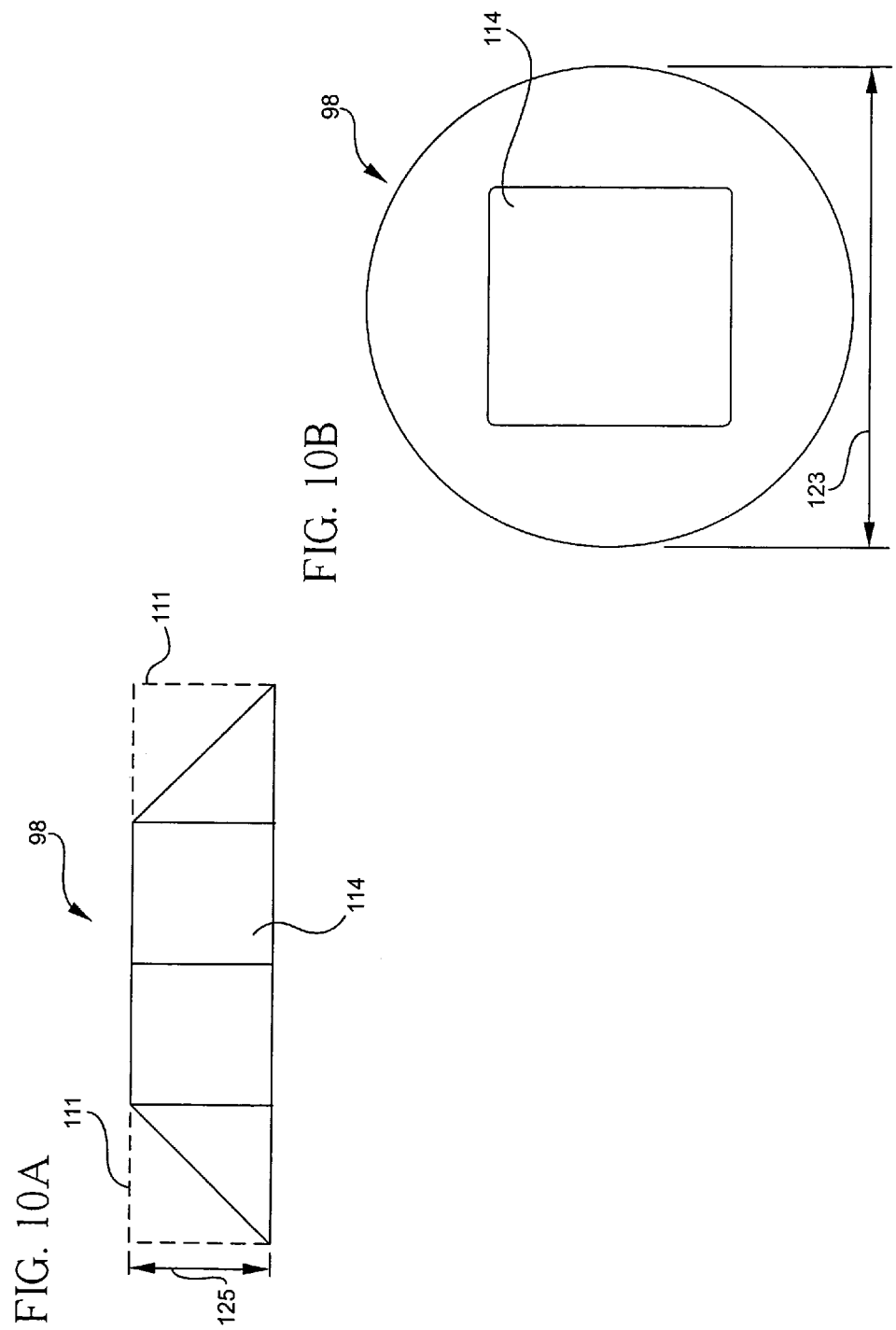

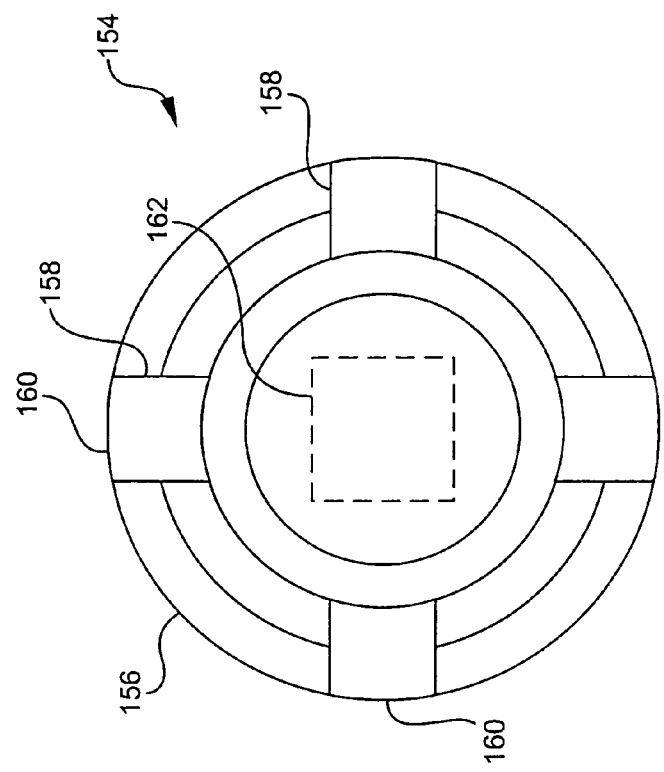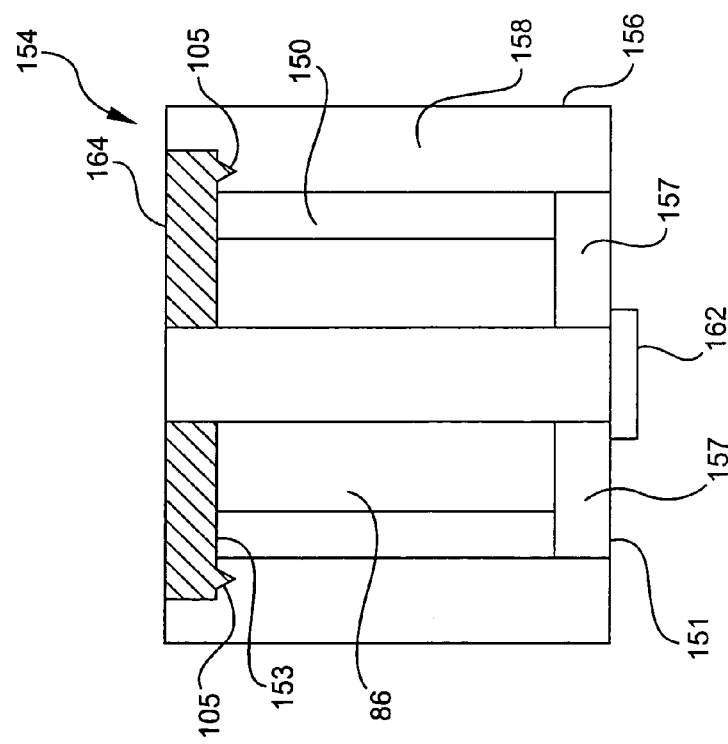

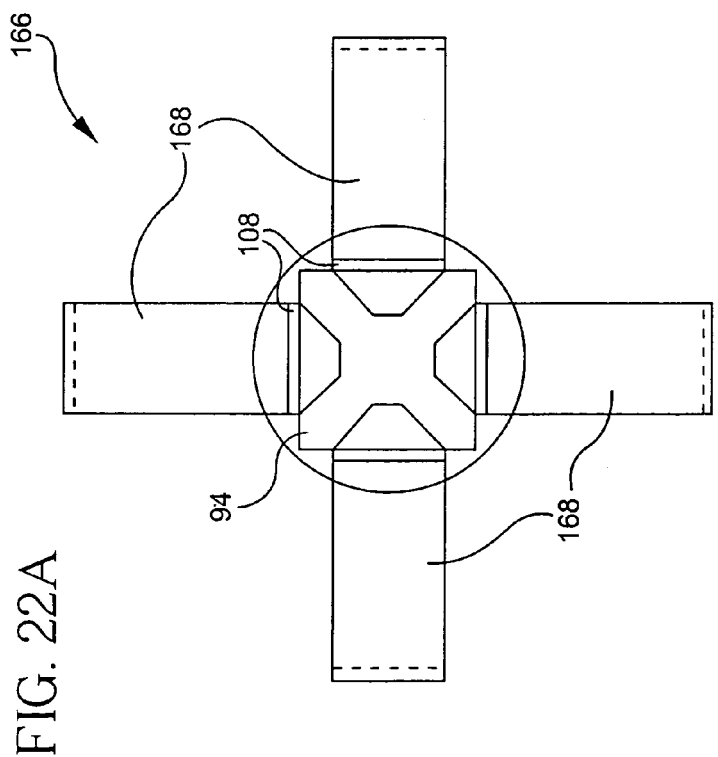
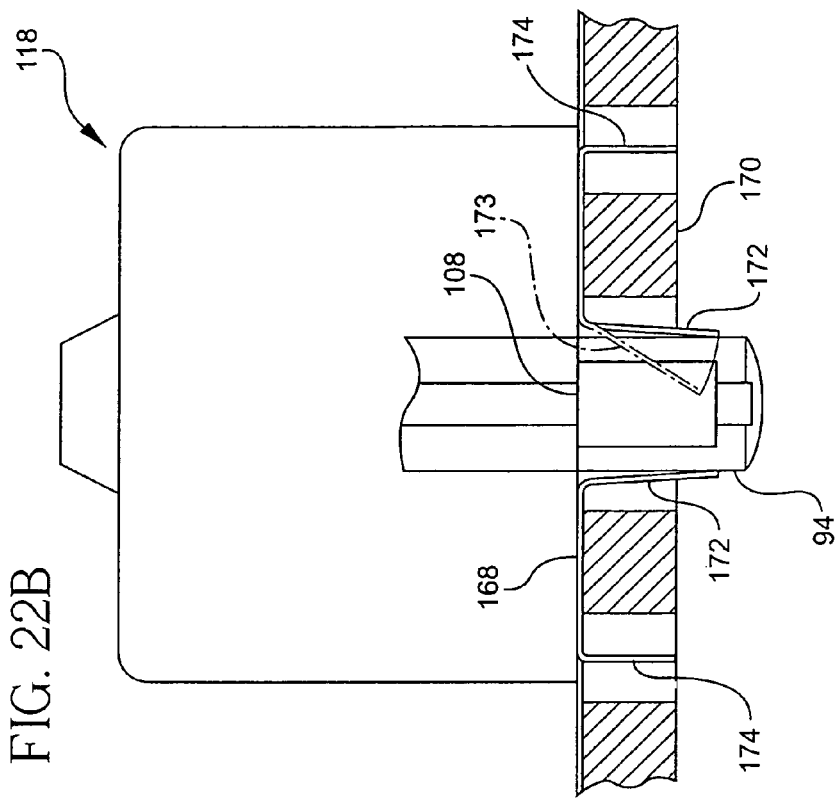
FIG. 22A
FIG. 22B

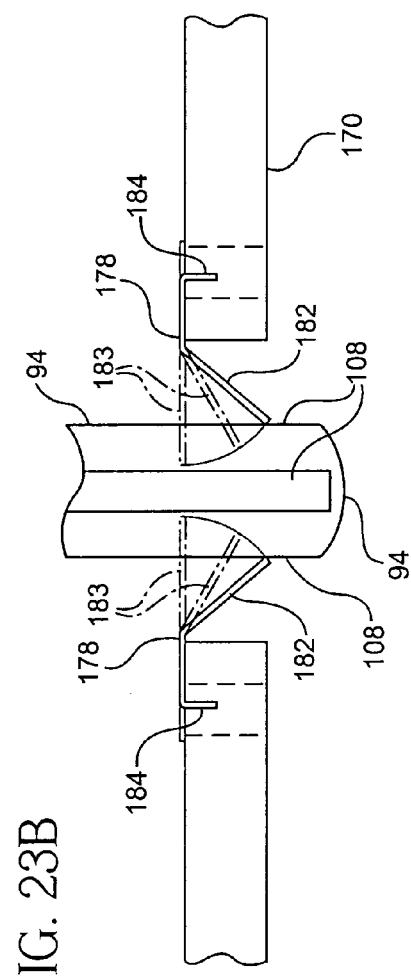
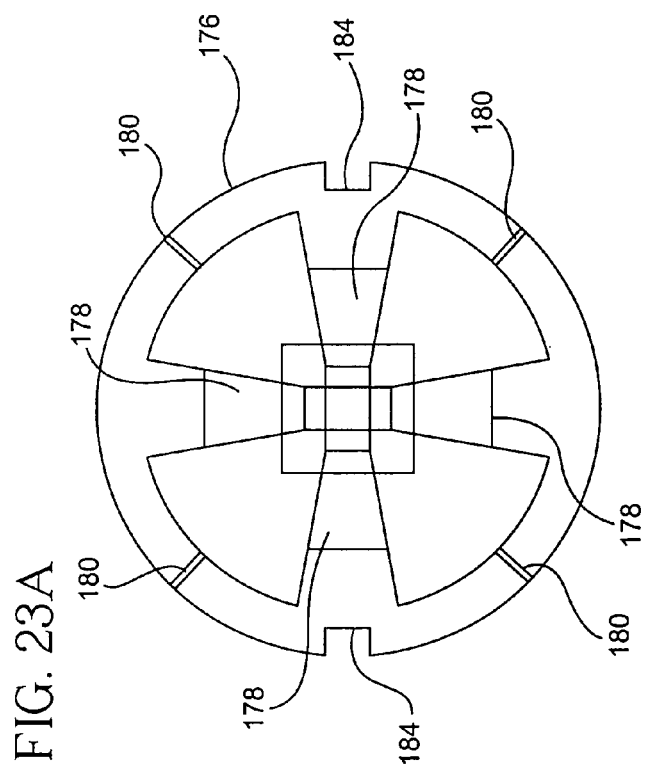
FIG. 23A
FIG. 23B

METHOD OF SENSING TILT, TILT SENSOR, AND METHOD OF MANUFACTURING SAME

BACKGROUND OF THE INVENTION

1. Field of the Invention

The present invention relates generally to tilt sensors. More particularly, the present invention relates to a low-cost, high-volume electrolytic tilt sensor.

2. Description of the Related Art

Electrolytic tilt sensors are devices that provide output signals proportional to the angle or direction of tilt in conjunction with a corresponding electrical circuit. Tilt sensors were originally used in weapons delivery and aircraft navigation, but are now used in a wide variety of applications, such as drilling, laser guidance, automotive wheel alignment, geophysical monitoring, virtual reality, and robotic systems.

Disadvantages commonly associated with conventional electrolytic tilt sensors include difficulties in manufacturing the sensor. Moreover, sensor manufacture requires a significant degree of skill, fixturing, labor-intensive handwork, and art by highly trained operators to achieve the desired parameters. In addition, tolerances of the glass housing during its processing can vary greatly, which results in either a higher reject rate and/or a greater range of mechanical and electrical tolerances in the end product. Further, tilt sensor components are relatively fragile due to their construction and must be handled with extreme caution.

With respect to glass electrolytic tilt sensors, great care must be afforded to the thermal and mechanical stress related characteristics of the glass during installation and alignment. This significantly limits the range of application of such sensors.

Conventional electrolytic tilt sensors also typically incorporate precious metal electrodes, which are sealed and attached by hand and account for a majority of the manufacturing cost of the completed sensor. Thus, the cost of manufacturing tilt sensors is substantially proportional to the number of electrodes required for each sensor.

Therefore, there is a need in the prior art for an electrolytic tilt sensor that is small, lightweight, rugged, simple, inexpensive to manufacture, applicable by various automated mounting processes, and requires fewer electrodes than conventional sensors. The need also exists for a tilt sensor that is readily adaptable to mass production techniques within acceptable tolerances.

SUMMARY OF THE INVENTION

The present invention, which addresses the needs of the prior art, relates to a method of sensing tilt, which includes applying an electrical signal to at least one electrode of a first set of spaced-apart electrodes and measuring a first electrical parameter using at least one electrode of a second set of spaced-apart electrodes. The first and second sets of electrodes are disposed in a conductive medium and the conductive medium is disposed in an envelope. The first electrical parameter is responsive to the applied electrical signal and represents an angle of tilt relative to a first axis, such that no more than four electrodes provide electrical parameters representative of angles of tilt relative to two non-parallel axes. The electrical signal can be applied in the form of a voltage or a current and can be applied as a continuous or time-varying signal, such as but not limited to an alternating current (ac) or direct current (dc) signal.

The electrical roles of the first and second sets of electrodes may be reversed to include applying an electrical signal to at least one electrode of the second set of electrodes, and measuring a second electrical parameter using at least one electrode of the first set of electrodes. The second electrical parameter is responsive to the applied electrical signal and represents an angle of tilt relative to a second axis.

The first set of electrodes and the second set of electrodes may be positioned such that the first axis is substantially non-parallel with the second axis, and the spacing between the first set of electrodes is equal to the spacing separating the second set of electrodes. The first electrical parameter may include at least one of voltage, current, resistance, capacitance, impedance, and inductance, and the first and second sets of electrodes each preferably include two electrodes.

The present invention further relates to a method of sensing tilt relative to a plurality of axes, which may include measuring the first electrical parameter from a first electrode, measuring the first electrical parameter from a second electrode, and combining the first electrical parameter measured from the first electrode and the second electrode. The combined first electrical parameter represents the angle of tilt relative to the first axis.

The present invention still further relates to a tilt sensor, which includes an envelope, a conductive medium disposed in the envelope in an amount adapted to provide a free liquid surface, and at least four electrodes disposed in the envelope such that a portion of each electrode is in contact with the conductive medium. The electrodes are electrically insulated from each other to provide at least a first set of spaced-apart electrodes and at least a second set of spaced-apart electrodes.

At least one electrode of at least one of the first set of electrodes and the second set of electrodes is adapted to be selectively connected to an electrical source such that an electrical signal is applied thereto. At least one electrode of at least one of the first set of electrodes and the second set of electrodes is adapted to be used to provide an electrical parameter in response to the applied electrical signal, wherein the electrical parameter is representative of an angle of tilt relative to at least one axis. No more than four electrodes provide electrical parameters representative of angles of tilt relative to two non-parallel axes.

The first set of electrodes defines a first axis, the second set of electrodes defines a second axis, and the first axis is substantially non-parallel with the second axis. The electrodes in each set of electrodes are disposed on substantially opposing sides of a non-conductive projection or envelope, and the tilt sensor preferably includes four electrodes.

The present invention yet further relates to a tilt sensing system, which includes the tilt sensor, an electrical source adapted to be connected to at least one electrode of at least one of the first set of electrodes and the second set of electrodes such that an electrical signal is applied thereto. The system may include one or more mixers adapted to combine at least one of the first electrical parameter and the second electrical parameter. The mixer is adapted to provide a tilt parameter representing an angle of tilt relative to at least one axis.

The electrical source may include a first signal generator and a second signal generator adapted to be connected to electrodes disposed on opposing sides of the non-conductive projection. The system may include amplifiers and three-state drivers.

The present invention still further relates to a method of making a tilt sensor, which includes providing at least four electrodes, forming an envelope adapted to receive at least a portion of the electrodes, placing a conductive medium into the envelope, and sealing the conductive medium in the envelope to be in contact with at least a portion of each electrode. The electrodes include at least two sets of spaced-apart electrodes, such that no more than four electrodes provide electrical parameters representative of angles of tilt relative to two non-parallel axes.

The electrodes may be formed on an electrode stud or an inner surface of the envelope. The electrode stud may include a plurality of spaced-apart longitudinal slots, in which the electrodes are disposed. The envelope may be adapted to receive at least a portion of a header disk, and the method may include forming the header disk to include an aperture adapted to receive the electrode stud, inserting the electrode stud in the aperture of the header disk, and inserting the header disk in the aperture of the envelope.

The method may also include forming a seal, which can be a poured or preformed seal made from epoxy or other known sealant material, around the electrode stud in the aperture of the header disk, and applying the seal around the electrode stud in the aperture of the header disk. Sealing the conductive medium in the envelope may include curing the seal.

The method may also include forming a molded header including the electrode stud and the header disk integral therewith. The molded header may include spaced-apart slots extending through apertures in the header disk, or spaced-apart slots substantially aligned with spaced-apart slots disposed on an exterior surface of the header disk. The envelope, electrode stud, header disk, seal, and molded header may include at least one of polyphenyleneoxide (PPO®) resin, polypropylene, Vectra®, Peak®, Ultem®, or the like and epoxy.

At least two of the envelope, electrode stud, header disk, seal, and molded header may have substantially the same temperature coefficient of expansion. The envelope may include a raised boss with an aperture therethrough, and the method may include applying the conductive medium through the aperture in the raised boss, and sealing the aperture in the raised boss.

The present invention yet further relates to a tilt sensor, which includes at least four electrodes, an envelope adapted to receive at least a portion of the electrodes, and a conductive medium sealed in the envelope. The conductive medium is in contact with at least a portion of each electrode. The electrodes include at least two sets of spaced-apart electrodes, such that no more than four electrodes provide electrical parameters representative of angles of tilt relative to two non-parallel axes.

The tilt sensor may include means for connecting the tilt sensor to a circuit board, in which the connecting means includes cantilevered contact arms adapted to connect the electrodes to conductive portions of the circuit board. The contact arms may initially be connected to each other and adapted for separation following application to the circuit board.

As a result, the present invention provides electrolytic tilt sensors that are small, lightweight, rugged, simple, inexpensive to manufacture, applicable by various automated and non-automated assembly processes, and require fewer electrodes than conventional tilt sensors. The subject tilt sensors are also readily adaptable to mass production techniques within acceptable tolerances for use in a variety of different applications, including, but not limited to applications requiring the measurement of tilt relative to any reference acceleration, such as gravity.

These and other objects, features, and advantages of this invention will become apparent from the following detailed description of illustrative embodiments thereof, which is to be read in connection with the accompanying drawings.

BRIEF DESCRIPTION OF THE DRAWINGS

FIG. 7 is a cross-sectional view of a first embodiment of the tilt sensor formed in accordance with the present invention.

FIG. 8a is a view of an electrode stud for use in barrel plating.

FIG. 8b is a top view of an electrode stud for use in the tilt sensor shown in FIG. 7.

FIGS. 10a and 10b are side cross-sectional and top views, respectively, of a seal for use in the tilt sensor shown in FIG. 7.

FIG. 15b is an isometric view of a second embodiment of the molded header shown in FIG. 15a.

FIG. 15c is an isometric view of a third embodiment of the molded header shown in FIG. 15a.

FIG. 16a is an isometric view of a fourth embodiment of the molded header shown in FIG. 15a.

FIG. 16b is a side cross-sectional view of the third embodiment of the tilt sensor including the molded header shown in FIG. 16a.

FIG. 17a is a top view of the molded header shown in FIG. 16a.

FIG. 17b is a side cross-sectional view of the third embodiment of the tilt sensor including the molded header shown in FIG. 16a.

FIGS. 18a and 18b are bottom views of first and second embodiments of an electrode stud portion of the molded headers shown in FIGS. 15a, 15b, 15c, and 16a.

FIGS. 19a and 19b are side cross-sectional and top views, respectively, of a fourth embodiment of the tilt sensor formed in accordance with the present invention.

FIGS. 22a and 22b are top and side cross-sectional views, respectively, of a first embodiment of a connector for the tilt sensor formed in accordance with the present invention.

FIGS. 23a and 23b are top and side cross-sectional views, respectively, of a second embodiment of a connector for the tilt sensor formed in accordance with the present invention.

DETAILED DESCRIPTION OF THE PREFERRED EMBODIMENTS

Figure 1:
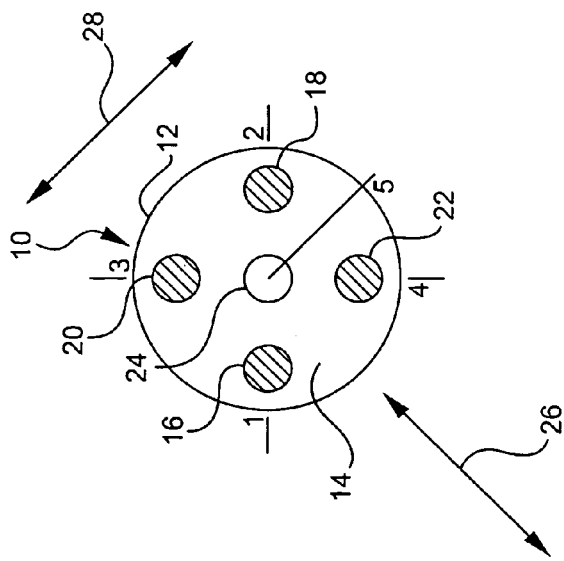
FIG. 1 is a simplified schematic diagram of a five-pin tilt sensor.

FIG. 1 shows a simplified schematic diagram of a tilt sensing system, which incorporates a five-pin electrolytic tilt sensor 10. The tilt sensor 10 typically includes a housing 12 made of a non-conductive material, such as glass. The housing 12 is partially filled with an electrolytic solution 14 such that there is a free liquid surface therein. The housing 12 encloses a plurality of electrodes 16, 18, 20, 22, 24, which are partially immersed in the electrolytic solution 14 when the tilt sensor 10 is in an upright, zero tilt, or electrical null position. One of the electrodes, typically a center electrode 24, is a common electrode, and the remaining electrodes 16, 18, 20, 22 are sensing electrodes, which are grouped in one or more pairs that define one or more distinct tilt axes 26, 28 in conjunction with the center common electrode 24.

As the sensor 10 is tilted with respect to a horizontal plane, each of the sensing electrodes 16, 18, 20, 22 becomes more or less immersed in the electrolytic solution 14 as the surface of the electrolytic solution 14 is forced to remain parallel to the horizontal plane. The increase or decrease in electrode immersion results in a corresponding change in impedance between any one of the sensing electrodes 16, 18, 20, 22 and the common electrode 24. This impedance change is measured as an output signal 30 from the common electrode 24 and correlated to a tilt angle or direction by an electrical conditioning circuit.

However, since the cost of manufacturing tilt sensors is substantially proportional to the number of electrodes required for each sensor, it would be advantageous if a tilt sensor could be developed that could function with fewer electrodes. Accordingly, high-volume applications would greatly benefit from such a tilt sensor. The present invention solves each of these problems by providing an easy to manufacture, four pin, dual-axis tilt sensor that was not previously known or available.

Figure 2:
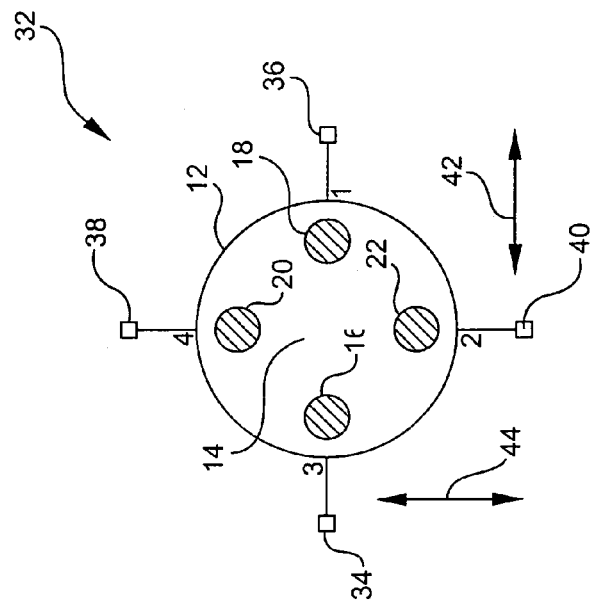
FIG. 2 is a simplified top view of a four-pin tilt sensor formed in accordance with the present invention.

FIG. 2 shows a simplified top view of a dual-axis, four-pin tilt sensor 32 formed in accordance with the present invention. The reduction from five electrodes in the conventional sensor shown in FIG. 1 to four electrodes shown in FIG. 2 substantially simplifies the design reducing the complexity of testing and enabling a cost-efficient method of manufacturing the sensor. The four-pin design of the present invention is also rugged enough for use in the most demanding applications. It is envisioned that the tilt sensor of the present invention could be used in any capacity in which it is desirable to measure tilt in relation to an acceleration, such as the earth's gravity.

The novel four-pin dual-axis tilt sensor 32 preferably includes four (4) spaced-apart electrodes 16, 18, 20, 22. The electrodes 16, 18, 20, 22 are preferably disposed in a conductive medium 14, such as an electrolyte or electrolytic fluid, within an envelope 12. Each of the electrodes 16, 18, 20, 22 is also accessible outside the envelope 12 at, for instance, nodes 34, 36, 38, 40, respectively, which are preferably conductive extensions of the electrodes within the envelope 12.

Specifically, a first electrode 18 is connected to node 36, a second electrode 22 is connected to node 40, a third electrode 16 is connected to node 34, and a fourth electrode 20 is connected to node 38. The second electrode 22 and fourth electrode 20 are preferably disposed across from each other on opposite sides of the envelope 12 and form a line that is substantially parallel with a first axis 42. Likewise, the first electrode 18 and third electrode 16 are preferably disposed across from each other on opposite sides of the envelope 12 and form a line that is substantially parallel with a second axis 44. The first axis 42 is preferably non-parallel with or perpendicular to the second axis 44.

Figure 3:
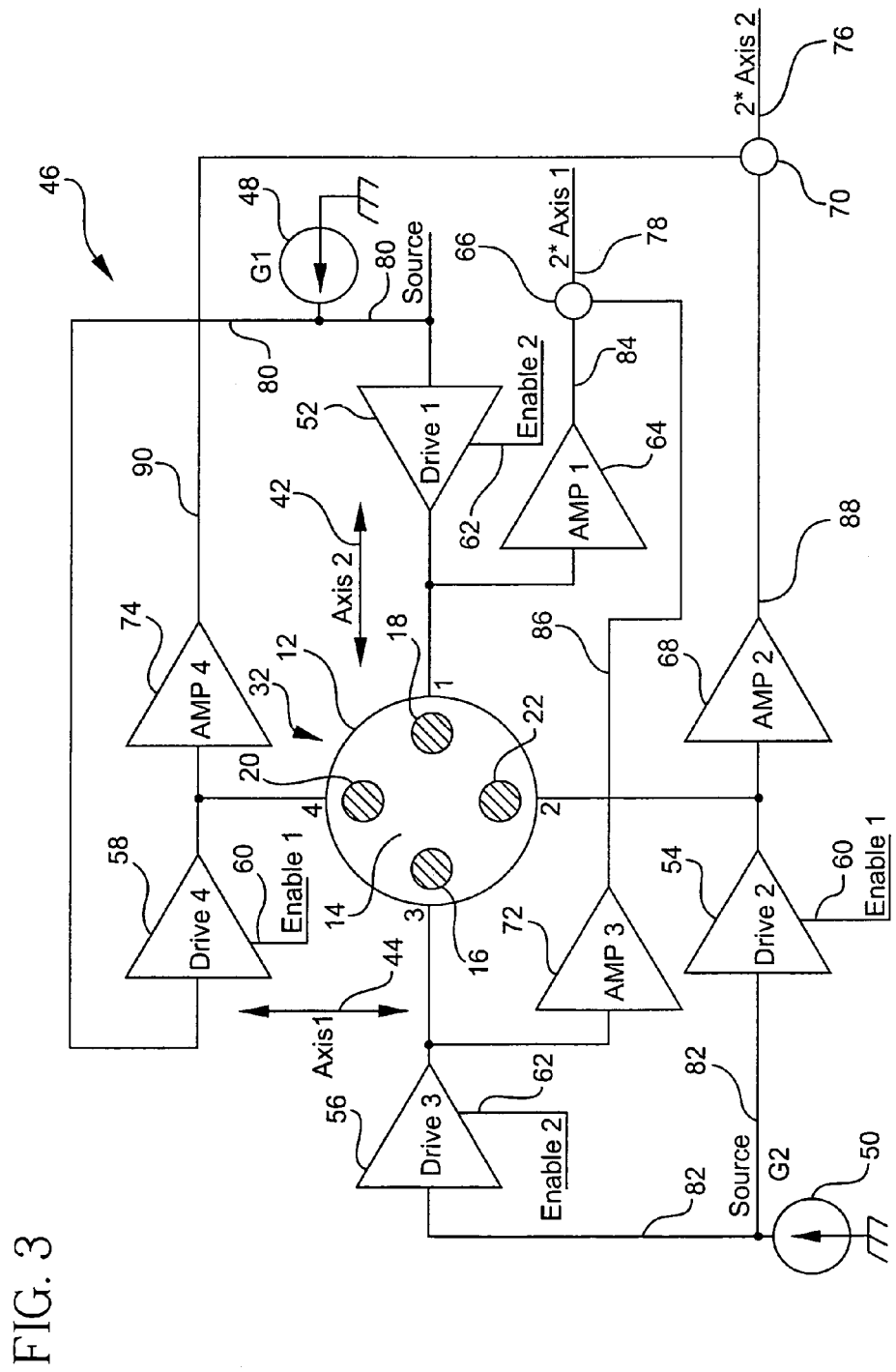
FIG. 3 is a simplified schematic diagram of a first embodiment of a signal conditioner circuit that incorporates the tilt sensor shown in FIG. 2.

FIG. 3 shows a simplified schematic diagram of a signal conditioner circuit 46, which incorporates the dual-axis four-pin tilt sensor 32 shown in FIG. 2. The signal conditioner circuit 46 preferably includes a first signal generator 48 and a second signal generator 50, which provide a first excitation signal and a second excitation signal, respectively. The signal generators may take any known form, such as but not limited to a voltage source or a current generator. An output of the first signal generator 48 is preferably connected to a three-state driver 52, the output of which is connected to the first electrode 18 of the tilt sensor 32. The second signal generator 50 is preferably connected to a second driver 54, the output of which is connected to the second electrode 22.

The second signal generator 50 is also preferably connected to a third three-state driver 56, the output of which is connected to the third electrode 16 of the tilt sensor 32. The first signal generator 38 is preferably connected to a fourth three-state driver 58, the output of which is connected to the fourth electrode 20. The second and fourth three-state drivers 54, 58 are selectively enabled by a first enable signal 50. The first and third three-state drivers 52, 56 are preferably enabled by a second enable signal 62.

The first electrode 18 is preferably connected to a first amplifier 64, the output of which is connected to a first mixer 66. The second electrode 22 is preferably connected to a second amplifier 68, the output of which is connected to a second mixer 70. The third electrode 16 is preferably connected to a third amplifier 72, the output of which is connected to the first mixer 66. The fourth electrode 18 is preferably connected to a fourth amplifier 74, the output of which is connected to the second mixer 70. The amplifiers 64, 68, 72, 74 preferably have a relatively high input impedance in comparison to the sensor output resistance.

By activating the first enable signal 60, the first signal generator 48 is preferably connected to the fourth electrode 20, the second signal generator 50 is connected to the second electrode 22, and the outputs of the first electrode 18 and third electrode 16 are connected through the first amplifier 64 and the third amplifier 72, respectively, to the first mixer 66. The first mixer 66 combines outputs from the first and third electrodes 18, 16 and provides a first tilt signal 78, which is then used to determine the amount of tilt with respect to the first axis 44.

Figure 4:
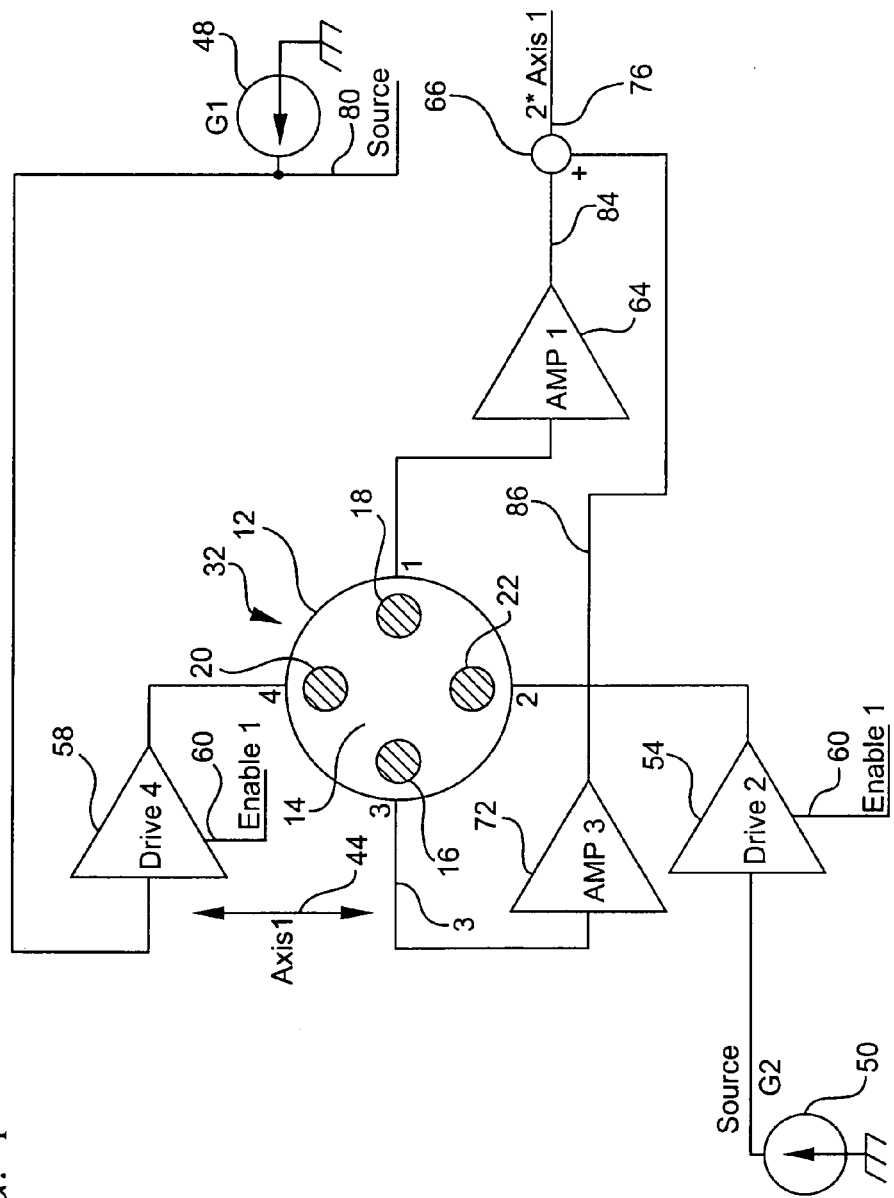
FIG. 4 is a portion of the schematic diagram shown in FIG. 3 that is enabled during measurement of tilt with respect to a first axis.

This situation is simplified in FIG. 4, which shows only those components that are enabled by the first enable signal 60, that is, the second driver 54 and the fourth driver 58. In this case, the first amplifier 64 and third amplifier 72 provide signals to the first mixer 66, the output of which is used to determine the amount of tilt with respect to the first axis 44.

Likewise, referring back to FIG. 3, the amount of tilt can be determined with respect to the second axis 42. Specifically, by activating the second enable signal 62, the first signal generator 48 is connected to the first electrode 18, the second signal generator 50 is connected to the third electrode 16, and the outputs of the second electrode 22 and fourth electrode 20 are connected through the second amplifier 68 and the fourth amplifier 74, respectively, to the second mixer 70. The second mixer 70 combines the outputs of the second and fourth electrodes 22, 20 and provides a second tilt signal 76, which is then used to determine the amount of tilt with respect to the second axis 42.

Figure 5:
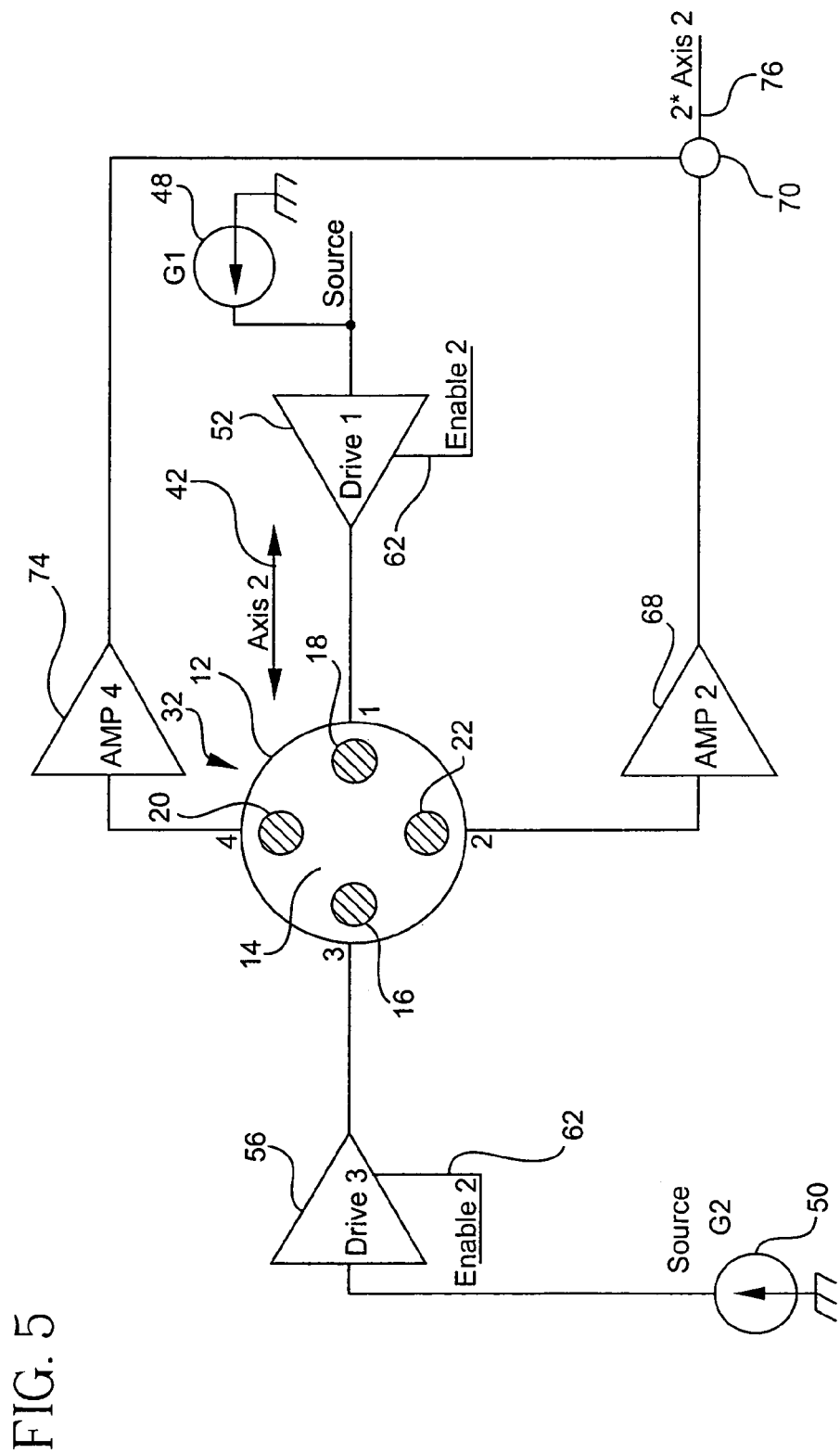
FIG. 5 is a portion of the schematic diagram shown in FIG. 3 that is enabled during measurement of tilt with respect to a second axis.

This situation is simplified in FIG. 5, which shows only those components that are enabled by the second enable signal 62, that is, the first driver 52 and the third driver 56. In this case, the second amplifier 68 and fourth amplifier 74 provide signals to the second mixer 70, the output of which is used to determine the amount of tilt with respect to the second axis 42.

Figure 6:
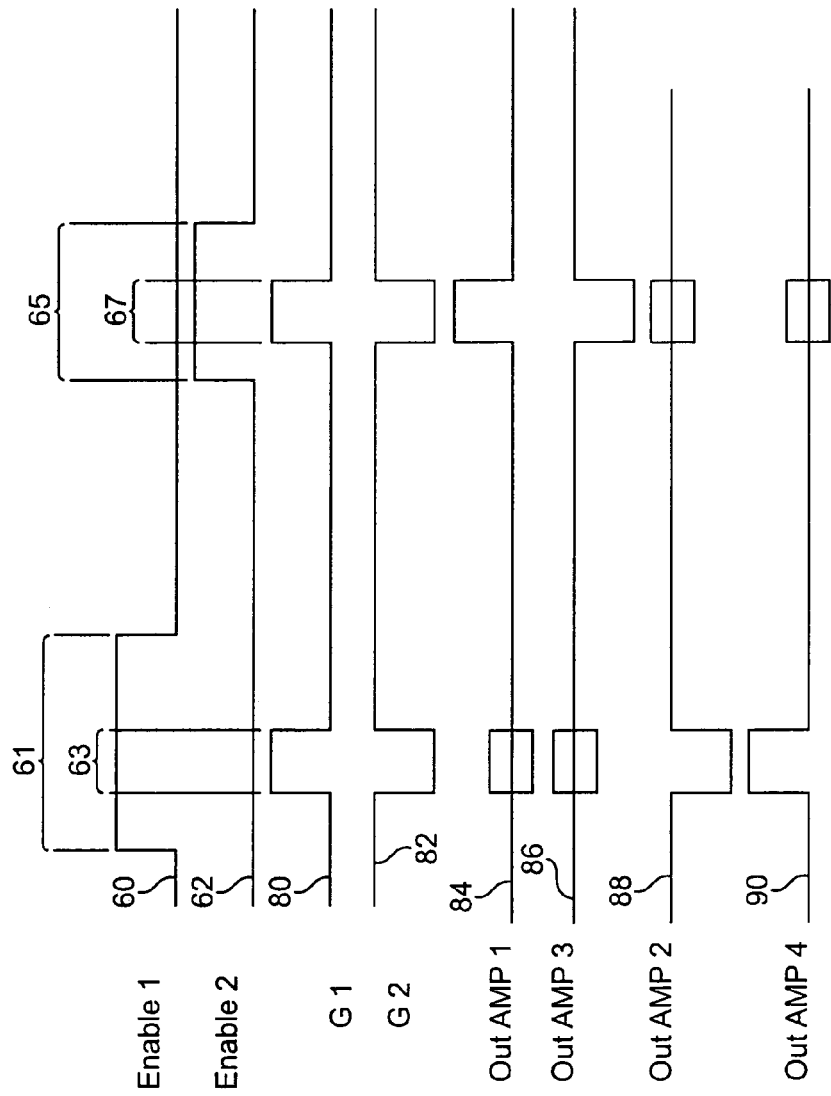
FIG. 6 is a timing diagram for signals shown in the schematic diagram of FIG. 3.

FIG. 6 shows a timing diagram for signals associated with the schematic diagram of FIG. 3. Tilt with respect to the first axis 44 shown in FIG. 3 is measured when the first enable signal is high 60 and the second enable signal 62 is low during a period 61. During a portion of period 61, a first excitation signal 80, which is generated by the first signal generator 48, is high, and a second excitation signal 82, which is generated by the second signal generator 50, is low, which is defined as a period 63. During period 63, a voltage difference, which is preferably a time-varying signal, such as an alternating current (ac) signal to substantially eliminate electrode and electrolyte degradation (but may also be a voltage, current, or substantially constant signal) is imposed across the second electrode 22 and the fourth electrode 20. During the period 63, the first signal generator 48 and the second signal generator 50 are preferably disconnected from the first electrode 18 and third electrode 16, respectively, by keeping the second enable signal 62 low, which keeps the third driver 56 and first driver 52 in the three-state mode.

This essentially places the second electrode 22 and fourth electrode 20 in a Wheatstone bridge configuration, the output of which is provided on the first electrode 18 and third electrode 16 through the first amplifier 64 and third amplifier 72, respectively. A first amplified output signal 84, which is output from the first amplifier 64, and a third amplified output signal 86, which is output from the third amplifier 72, are summed in the first mixer 66. The first mixer 66 outputs a first tilt signal 78, which represents the degree of tilt relative to the first axis 44.

During period 63, the voltage appearing across the first electrode 18 and third electrode 16 is proportional to the tilt of the sensor 32 since there is substantially no influence thereon by the first amplifier 64 and third amplifier 72, due to their high input impedance in comparison with their output impedance, and the first and third electrodes 18, 16 being equidistant from the second and fourth electrodes 22, 20. Also during period 63, a second amplified output signal 88, which is output from the second amplifier 68, and a fourth amplified output signal 90, which is output from the fourth amplifier 74, follow the second excitation signal 82 and the first excitation signal 80, respectively. Thus, when the second amplified output signal 88 and fourth amplified output signal 90 are combined in the second mixer 70, the result is substantially zero, which correctly represents a null measurement with respect to the second axis 42 during measurement of tilt with respect to the first axis 44.

Similarly, tilt with respect to the second axis 44 shown in FIG. 3 is measured when the first enable signal is low 60 and the second enable signal 62 is high during a period 65. During a portion of period 65, the first excitation signal 80 is high, and the second excitation signal 82 is low, which is defined as period 67. During period 67, a voltage difference is imposed across the first electrode 18 and third electrode 16. Also during period 67, the first signal generator 48 and second signal generator 50 are preferably disconnected from the second electrode 22 and fourth electrode 20, respectively, by keeping the first enable signal 60 low, which keeps the second driver 54 and fourth driver 58 in the three-state mode.

This essentially places the first electrode 18 and third electrode 16 in a Wheatstone bridge configuration, the output of which is provided on the second electrode 22 and fourth electrode 20 through the second amplifier 68 and fourth amplifier 74, respectively. The second amplified output signal 88, which is output from the second amplifier 68, and the fourth amplified output signal 90, which is output from the fourth amplifier 74, are summed in the second mixer 70. The second mixer 70 outputs the second tilt signal 76, which represents the degree of tilt relative to the second axis 42.

During period 67, the voltage appearing across the second electrode 22 and fourth electrode 20 is proportional to the tilt of the sensor 32 since there is substantially no influence thereon by the second amplifier 68 and fourth amplifier 74, due to their high input impedance in comparison with their output impedance, and the second and fourth electrodes 22, 20 being equidistant from the first and third electrodes 18, 16. Also during period 67, the first amplified output signal 84, which is output from the first amplifier 64, and the third amplified output signal 86, which is output from the third amplifier 72, follow the first excitation signal 80 and the second excitation signal 82, respectively. Thus, when the first amplified output signal 84 and third amplified output signal 86 are combined in the first mixer 66, the result is substantially zero, which correctly represents a null measurement with respect to the first axis 44 during the measurement of tilt with respect to the second axis 42.

Although the tilt sensor 32 formed in accordance with the present invention has been described in terms of measuring a variable voltage caused by variations in resistance between electrodes as representing tilt, it is anticipated that the sensor may respond to variations in voltage, current, capacitance, inductance, impedance, and/or other electrical parameters between electrodes to indicate tilt while remaining within the scope of the present invention.

Figure 3A:
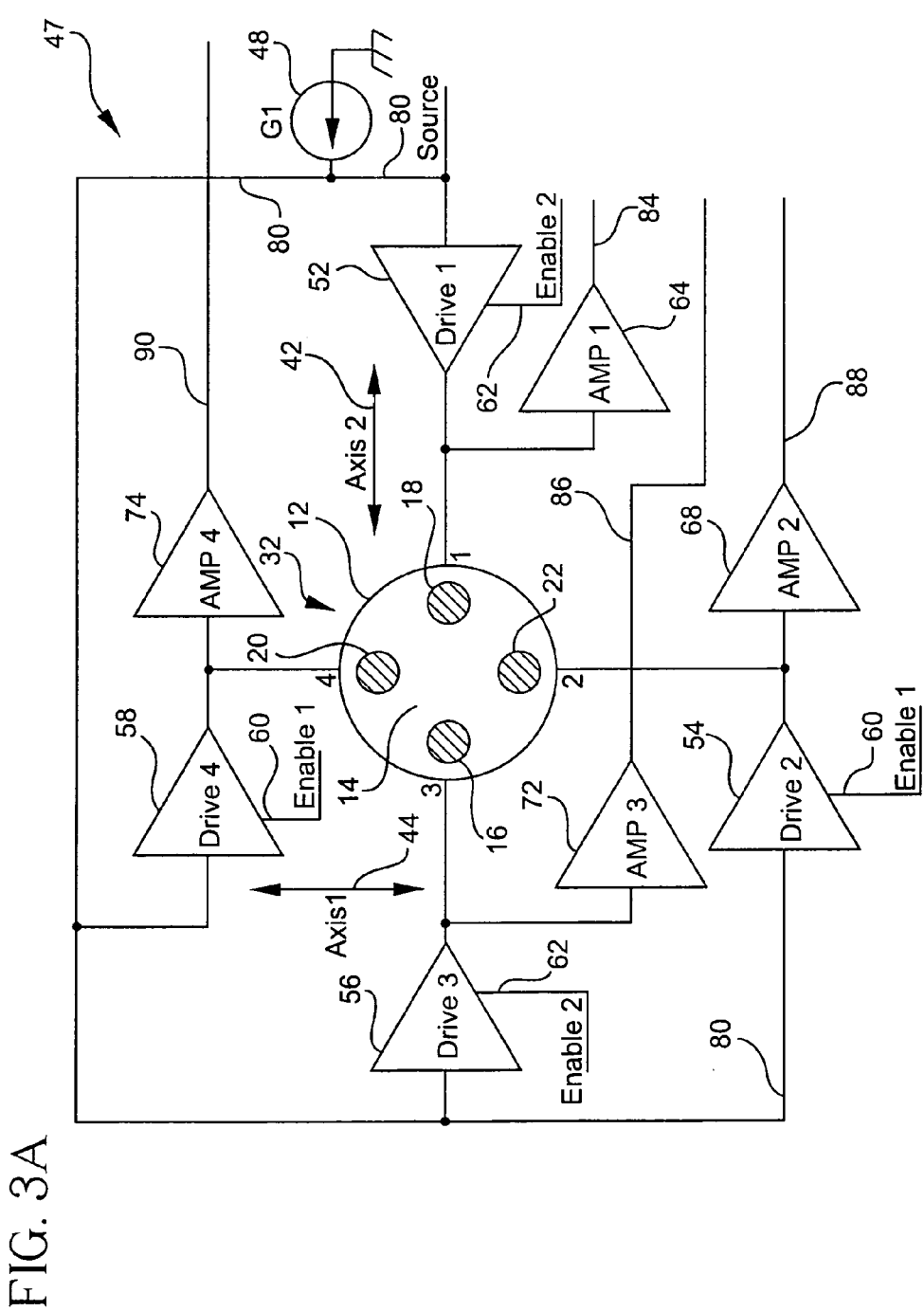
FIG. 3a is a simplified schematic diagram of a second embodiment of the signal conditioner circuit that incorporates the tilt sensor shown in FIG. 2.

For example, FIG. 3a shows a schematic diagram of a second embodiment of the signal conditioner circuit 47, which incorporates the tilt sensor 32 shown in FIG. 2. The second embodiment 47 is similar to the first embodiment 46, except that there is preferably only one signal generator 48, which is connected to each of the three-state drivers 52, 54, 56, 58, and the mixers 66, 70 have been eliminated.

By activating the first enable signal 60, the first signal generator 48 is connected to the fourth electrode 20 and the second electrode 22. The amount of current, for instance, is then obtained from the first amplified output signal 84 and the third amplified output signal 86 to determine tilt with respect to the first axis 44. For example, if the tilt is such that it causes more electrolytic fluid to be in contact with the first electrode 18 than the third electrode 16, then the current reading from the first amplified output signal 84 will be correspondingly greater than the current reading from the third amplified output signal 86, the difference between which is calibrated to provide the angle of tilt relative to the first axis 44.

FIG. 7 shows a cross-section of a first embodiment of a tilt sensor 92 formed in accordance with the present invention, which includes an electrode stud 94, header disk 96, seal 98, envelope 100, and conductive medium, such as an electrolyte or electrolytic solution 102. An ultrasonic seal 103 preferably seals the header disk 96 to the envelope 100. The seal 98 is preferably shaped to fit a counter sunk hole in the header disk 96 to ensure a longer contact with the electrode stud 94, but may also be shaped to fill a counter bored hole in the header disk 96, as shown by dotted lines 101.

FIG. 8a shows a side view of the electrode stud 94 for use in barrel plating, and FIG. 8b shows a bottom view of the electrode stud 94 shown in FIG. 7. The electrode stud 94 is preferably manufactured or molded from conductive and non-conductive materials, such as polyphenyleneoxide (PPO®) resin, by a two-shot molding process. The first shot preferably forms a body 104 of the electrode stud 94, which includes four (4) spaced-apart slots 106 that preferably run the length of the electrode stud 94. The slots 106 preferably form a mold for the second shot of the process, which includes filling the slots 106 with a conductive material, such as a conductive PPO® resin. The second shot preferably forms four (4) separate conductive traces 108 along the length of the electrode stud 94.

Figure 8D:
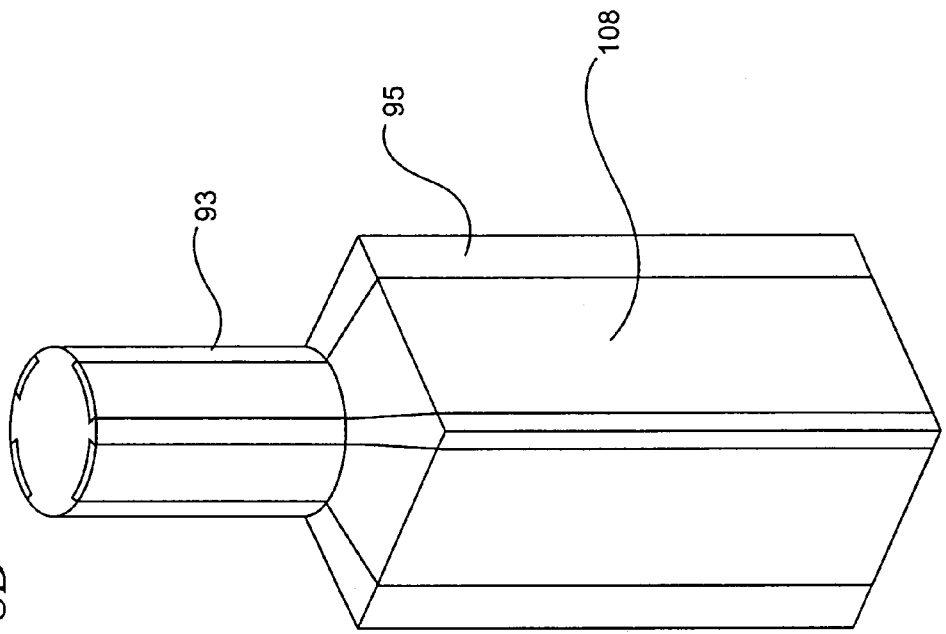
FIGS. 8c and 8d are views of electrode studs adapted for various methods of selective metallization.
Figure 8C:

The conductive traces 108 may or may not be selectively metallized or plated. FIG. 8c shows the electrode stud 94 with an attached break-off stem 91. The break-off stem 91 is preferably used to position the electrode stud 94 during metallization of the conductive traces 108 by, for example, masking the non-conductive material with a photoresistive material and applying conductive material by vapor deposition or sputtering. Similarly, FIG. 8d shows a rectangular electrode stud 95 with an attached break-off stem 93, which may also have a square or rectangular configuration. The break-off stem 93 is preferably used to position the electrode stud 94 during metallization of the conductive traces 108 by, for instance electroplating the conductive material.

Alternative methods of making the conductive traces fall within the scope of the invention. For example, the conductive traces may be formed by applying a conductive paint, coating, or other similarly conductive material to the electrode stud, or conductive tape may be applied to form the electrodes. The described methods of forming the electrodes are not intended to limit the scope of the invention and other methods know to those of ordinary skill in the art are contemplated herein.

Figures 9A, 9B:
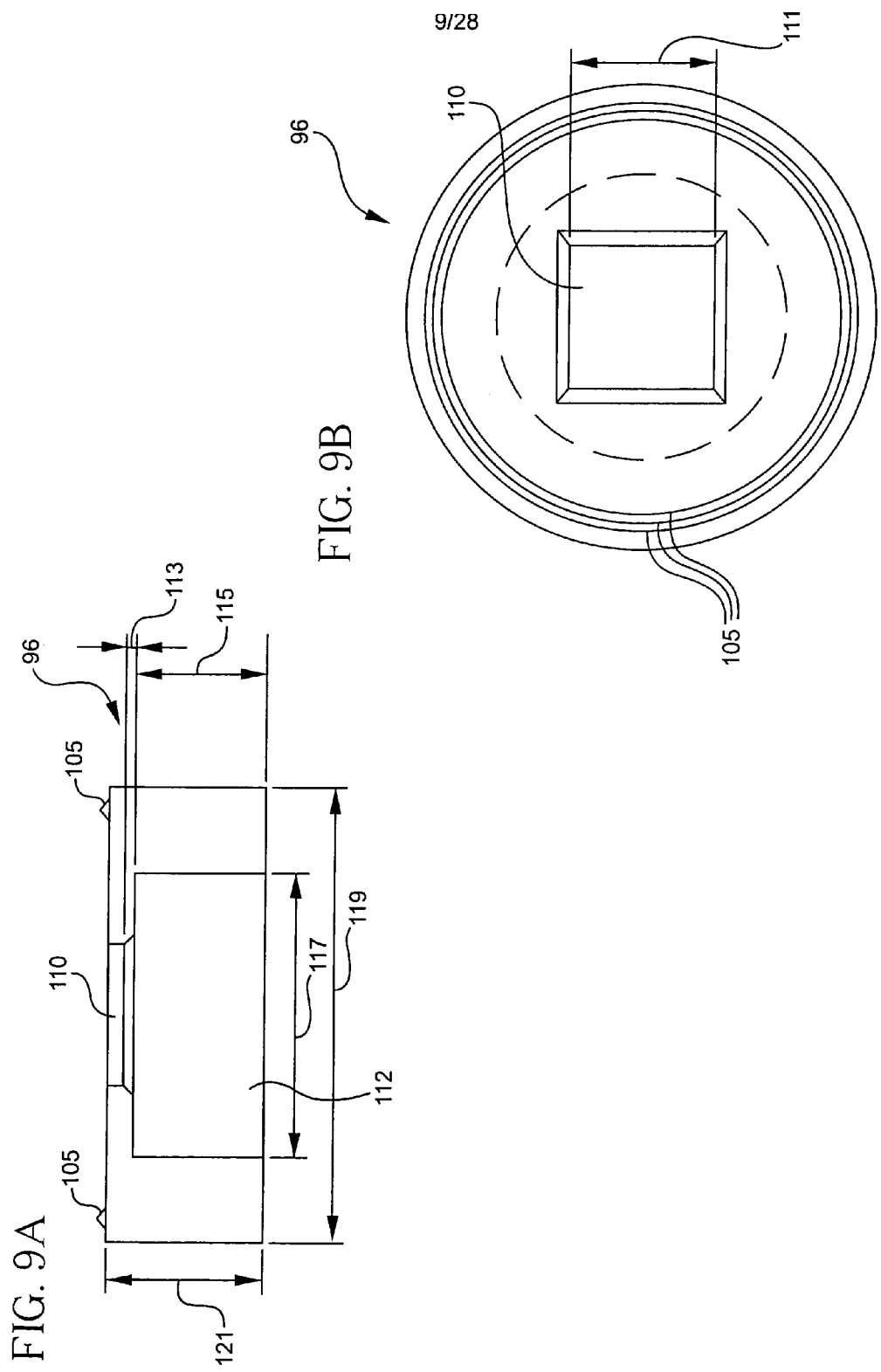
FIGS. 9a and 9b are side cross-sectional and top views, respectively, of a header disk for use in the tilt sensor shown in FIG. 7.

FIGS. 9a and 9b show a side cross-sectional view and a top view, respectively, of the header disk 96, which is preferably shaped as a round disc with a square hole 110 at its center that may be countersunk or counter bored. The hole 110 is preferably sized to accept insertion of the electrode stud 94 therethrough. The hole 110 is also preferably countersunk or counter bored, as shown in region 112 to accept insertion of the properly dimensioned seal 98, as shown in FIG. 7. An energy director 105, which is preferably a raised portion of an upper surface of the header disk 96 that mates with the envelope, is shown in FIGS. 9a, 9b, 15a, 15b, 16b, 17b, and 19a. The energy director 105 is melted during the ultrasonic welding process to form a seal between the header disk and envelope.

Figure 11:
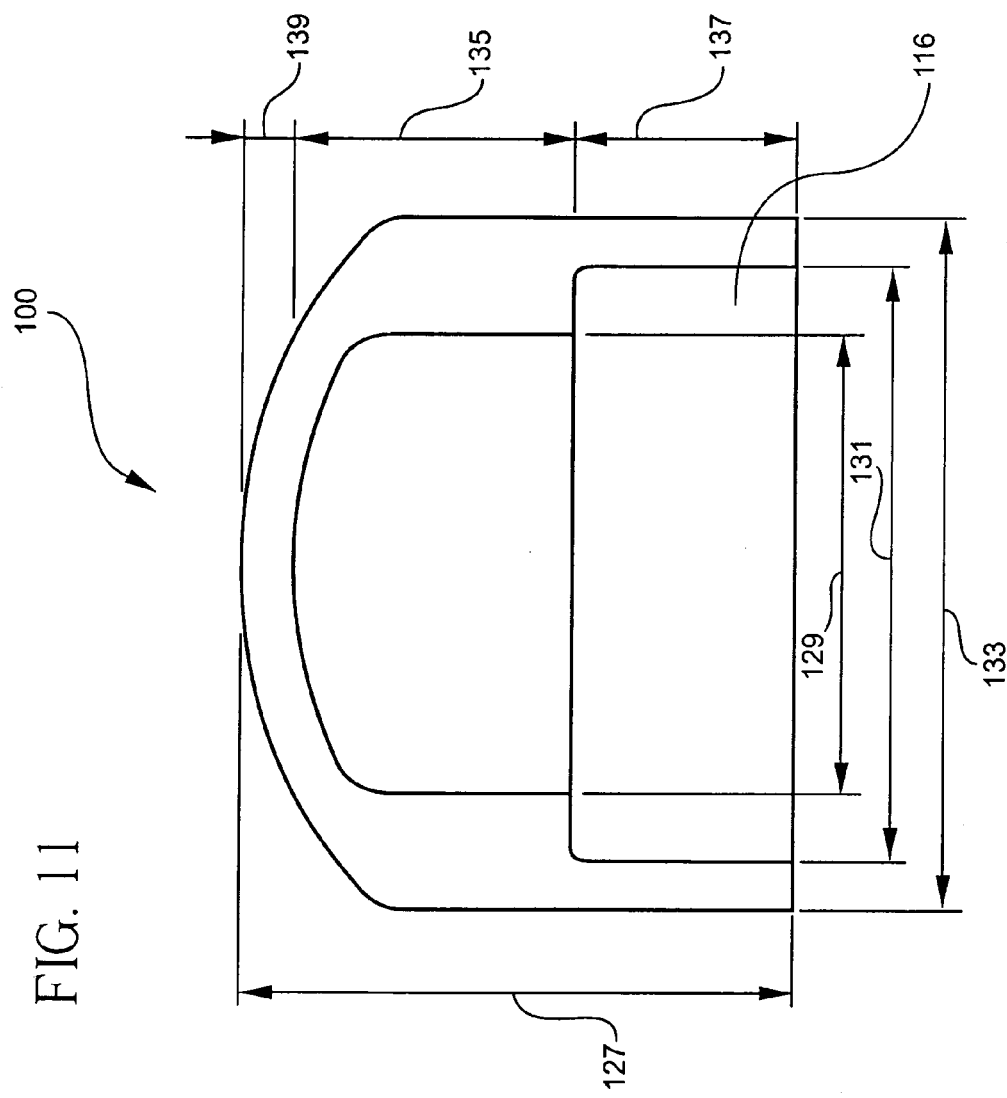
FIG. 11 is a side cross-sectional view of an envelope for use in the tilt sensor shown in FIG. 7.

The following dimensions are provided in inches and are intended only as an example of an embodiment of the invention and do not in any way limit the scope of the present invention. As shown in FIGS. 9a and 9b, dimension 111 is about 0.100, dimension 113 is about 0.010, dimension 115 is about 0.050, dimension 117 is about 0.200, dimension 119 is about 0.321, and dimension 121 is about 0.110. As shown in FIGS. 10a and 10b, dimension 123 is about 0.203, and dimension 125 is about 0.040. As shown in FIG. 11, dimension 127 is about 0.300, dimension 129 is about 0.250, dimension 131 is about 0.322, dimension 133 is about 0.372, dimension 135 is about 0.155, dimension 137 is about 0.120, and dimension 139 is about 0.025.

FIGS. 10a and 10b show a side cross-sectional view and a top view, respectively, of the seal 98. The seal 98 preferably includes a hole 114, which is dimensioned to fit within the countersunk or counter bored region 112 as indicated by dotted lines 111, of the header disk 96 and around the electrode stud 94, which is preferably inserted through the header disk 96. The seal 98 is also preferably manufactured from a curable material, such as epoxy, and formulated such that when cured it will exhibit approximately the same temperature coefficient of expansion as the electrode stud 94 and header disk 96.

A header assembly, which includes the electrode stud 94, header disk 96, and seal 98, is preferably formed by inserting the electrode stud 94 through the hole 110 in the header disk 96 so that the electrode stud 94 extends from both faces of the header disk 96 at a proper distance and is positioned such that the header disk 96 faces upward. The seal 98 is then preferably oriented to fit around the electrode stud 94 and into the countersunk region 112 of the header disk 96. The header assembly is then preferably placed into an environment having a suitable temperature to cure the seal 98 given an appropriate period of time. Curing of the seal 98 preferably produces a hermetic seal between the electrode stud 94 and the header disk 96 in order to retain the electrolytic solution 102 within the envelope 100.

The assembly of the electrode stud 94, header disk 96, and seal are described above as but one example of a method of forming the electrode assembly for the dual-axis, tilt sensor of the present invention. It is contemplated that variations and different manufacturing techniques may be used to form the electrode assembly, which variations fall within the scope of the invention. By way of example, the stud and header disk may be formed as a single component, or other combinations of these components may be combined to form the electrode assembly.

FIG. 11 shows a side cross-sectional view of the envelope 100, which is preferably manufactured from a non-conductive material, such as non-conductive PPO® resin. The envelope 100 is preferably formed with a cylindrical shape having a round hollow chamber that is closed at one end with a counter bored or tapered hole 116 at the other end. The counter bored or tapered hole 116 is preferably sized to tightly accept the outside circumference of the header disk 96.

The first embodiment shown in FIGS. 7–11 is preferably manufactured by positioning the envelope 100 so that its open end is facing up and injecting the electrolytic solution 102 into the open space defined by the envelope 100. The header assembly, which includes the electrode stud 94, header disk 96, and seal 98, is then preferably properly oriented and forced onto the shoulder of the counter bored hole 116 in the envelope 100. The header disk 96 is then preferably ultrasonically welded around the periphery of the counter bored hole 116 of the envelope 100. This hermetically seals the electrolyte 102 within the volume defined by the envelope 100 and the header assembly. Other methods of sealing the electrode assembly to the envelope or enclosure known to those of ordinary skill in the art, such as adhesives, epoxies, or the like are contemplated by the present invention.

Figure 12:
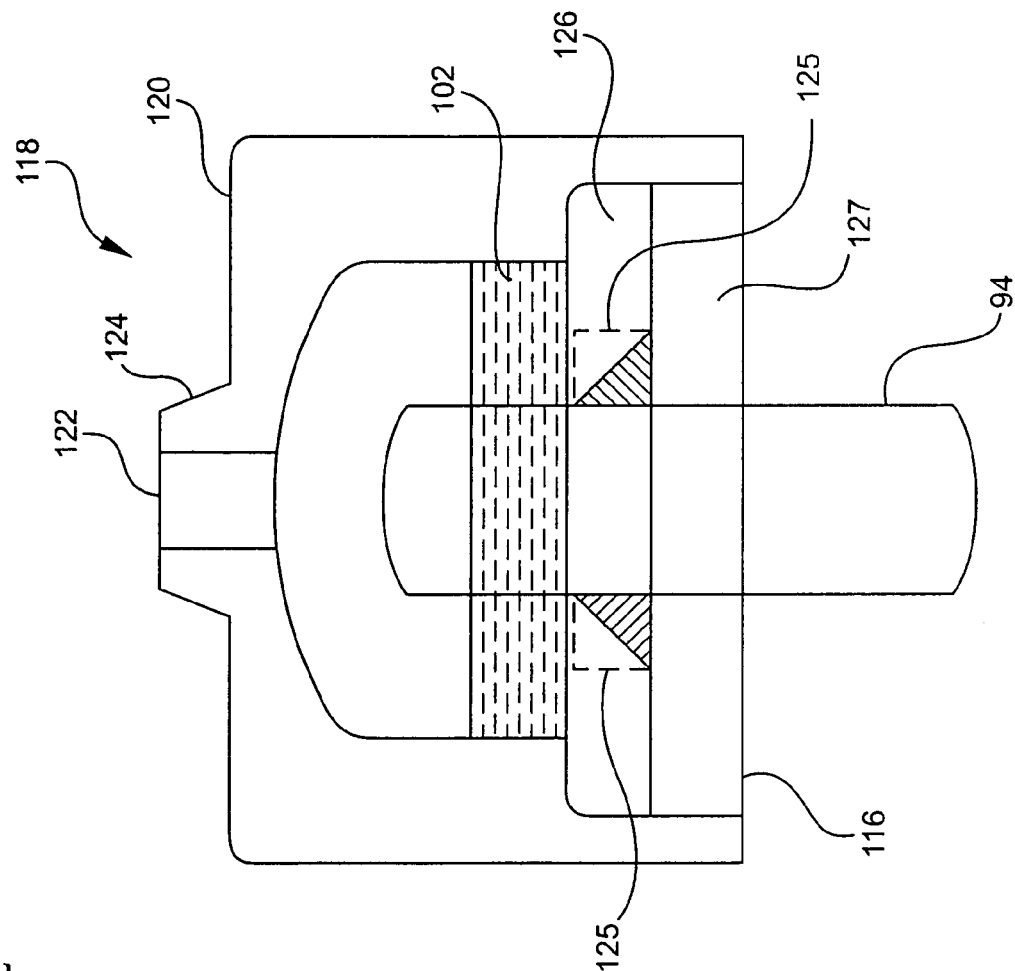
FIG. 12 is a side cross-sectional view of a second embodiment of the tilt sensor formed in accordance with the present invention.

A side cross-sectional view of a second embodiment of a tilt sensor 118 formed in accordance with the present invention is shown in FIG. 12. The second embodiment is similar to the first embodiment shown in FIG. 7, except that the top end of the envelope 120 includes a small hole 122 centrally or eccentrically located therethrough, which preferably runs through the top wall of the envelope 120 and a raised boss 124 in the envelope 120. The second embodiment is also different in that the header disk 96 and electrode stud 94 are preferably inserted into the counter bored hole 116 of the envelope and a seal 127 is positioned around the electrode stud 94 and forms a hermetic seal against an outer surface of the header disk 126 within the counter bored hole 116.

Figure 13A:
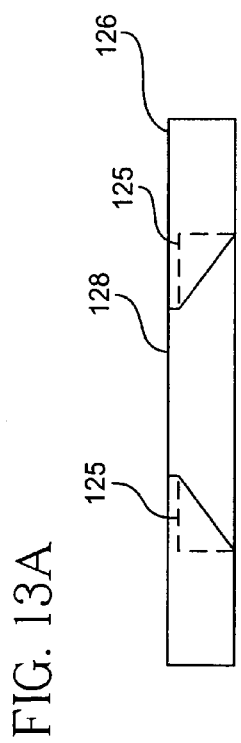
FIGS. 13a and 13b are side and top views, respectively, of the header disk for use in the tilt sensor shown in FIG. 12.
Figure 13B:
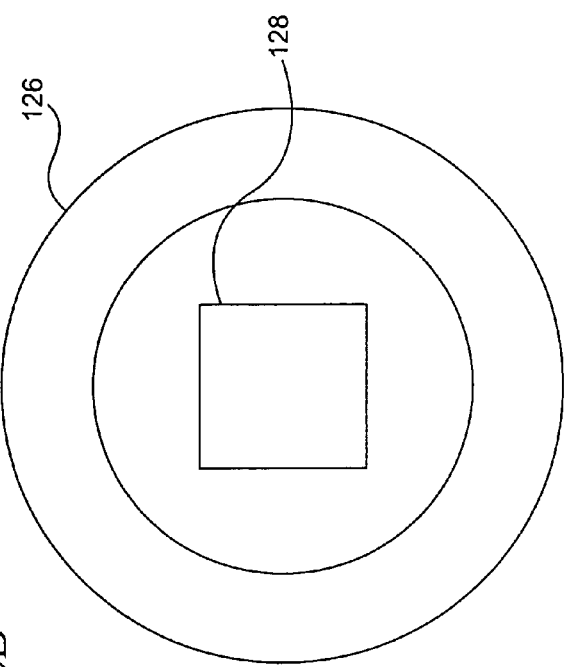
Figure 14:
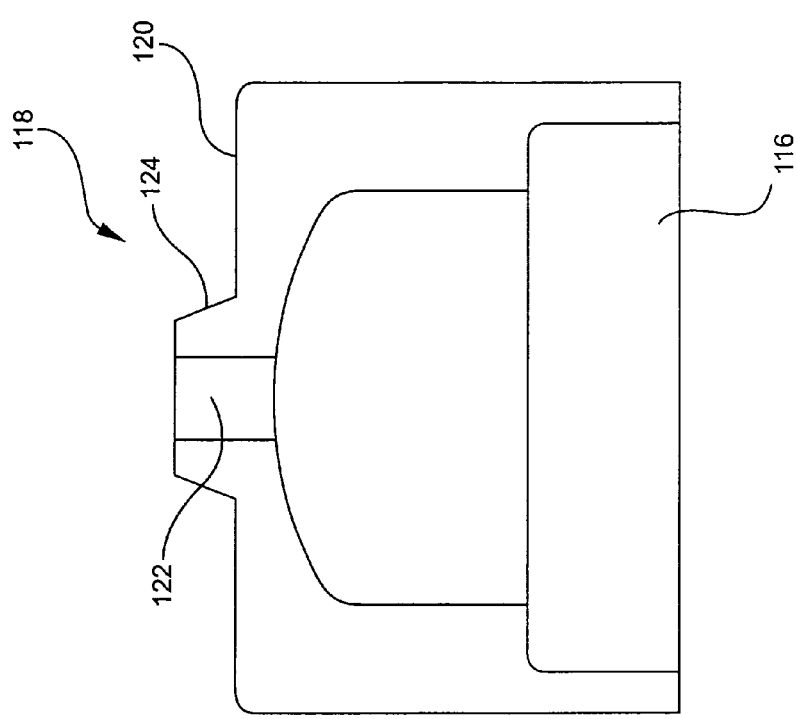
FIG. 14 is a side cross-sectional view of the second embodiment of the envelope for use in the tilt sensor shown in FIG. 12.

FIGS. 13a and 13b show a side cross-sectional view and top view, respectively, of the header disk 126. As in the first embodiment, the header disk 126 includes a hole 128, which is preferably sized to accept the electrode stud 94 therethrough. The header disk 126 shown in FIG. 12 may also include a counter bored, as shown by dotted lines 125, or countersunk region to accept the correspondingly shaped seal 127 as it forms a hermetic seal against an outer surface of the header disk 126 within the counter bored hole 116 of the envelope 120. FIG. 14 shows a side cross-sectional view of the envelope 120, which also includes the counter bored hole 116 sized to accept the outside diameter of the header disk 126 and seal 127 therein.

The second embodiment is preferably manufactured by positioning the envelope 120 such that the open counter bored end is facing up so that the electrode stud 94 and header disk 126 may be properly oriented and forced into the counter bored hole 116 of the envelope 120, as shown in FIG. 12. The header disk 126 may then be ultrasonically welded around the periphery of the counter bored hole 116. The seal 127 may then be applied to the outer surface of the header disk 126 and cured to provide a hermetic seal. The electrolyte 102 is then preferably injected into the envelope 120 through the top hole 122 in the center of the raised boss 124. The hole 122 is then preferably hermetically sealed with, for instance, heat to retain the electrolyte 102 within the envelope 120.

Figure 15A:
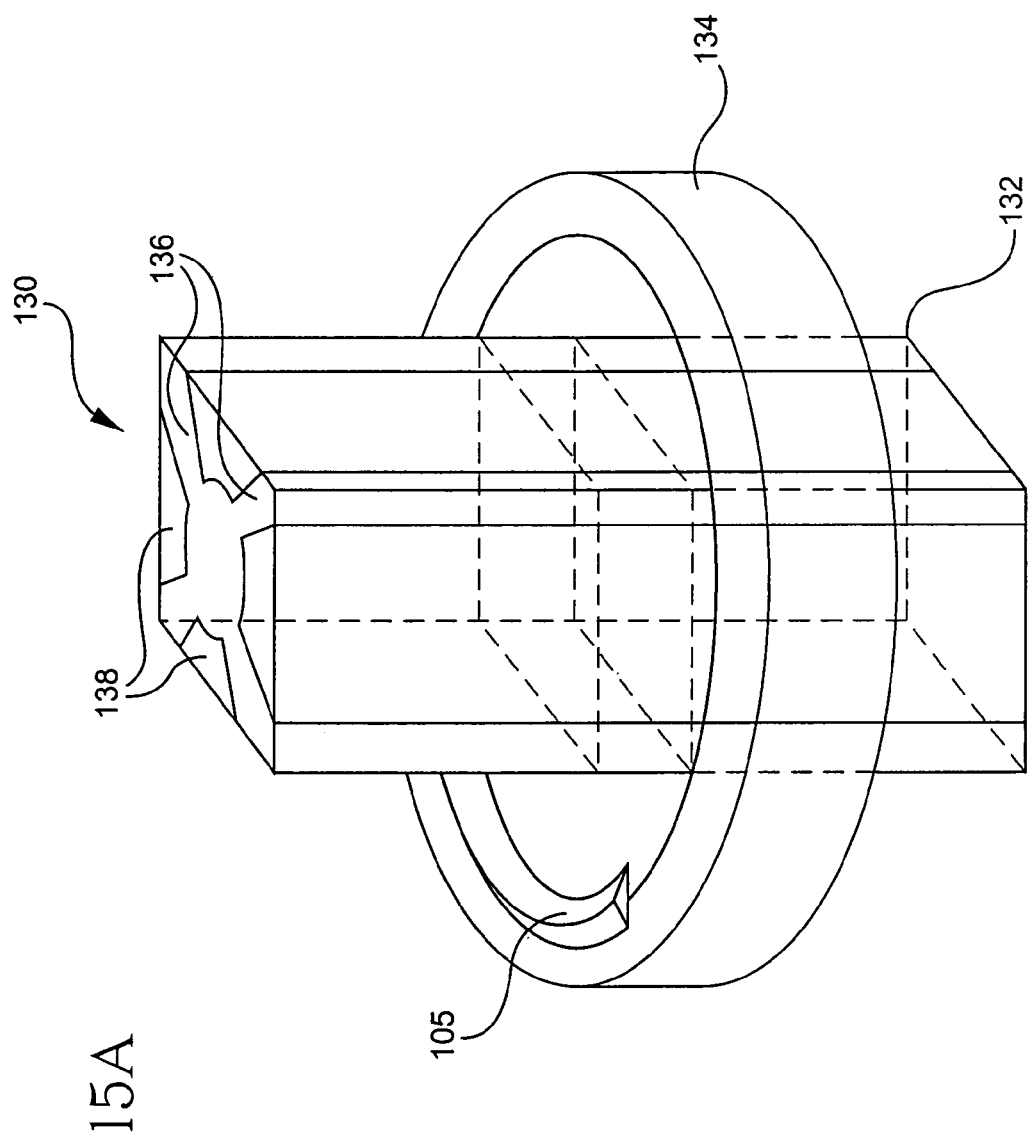
FIG. 15a is an isometric view of a molded header for use in a third embodiment of the tilt sensor formed in accordance with the present invention.

FIG. 15a shows an isometric view of a unitary molded header 130 for use in a third embodiment of the tilt sensor formed in accordance with the present invention. In the third embodiment, the tilt sensor is produced by a two-shot process. The first shot includes forming the unitary molded header 130 to include an electrode stud portion 132 and a header disk portion 134 from a non-conductive material, such as PPO® resin. The stud portion 132 preferably includes spaced-apart slots 136 that run the entire length of the electrode stud portion 132 and tunnel through the header disk portion 134.

The spaced-apart slots 136 preferably form a mold for the second shot of the process, which includes an application of conductive material, such as PPO® resin, to fill each of the preferably four (4) slots 136. The second shot preferably forms four (4) spaced-apart conductive traces 138 through the header disk portion 134. The conductive traces 138 may or may not be selectively plated or metallized. The remaining components of the third embodiment of the tilt sensor and its assembly may be substantially the same as that described in relation to the first embodiment.

Figure 15B:
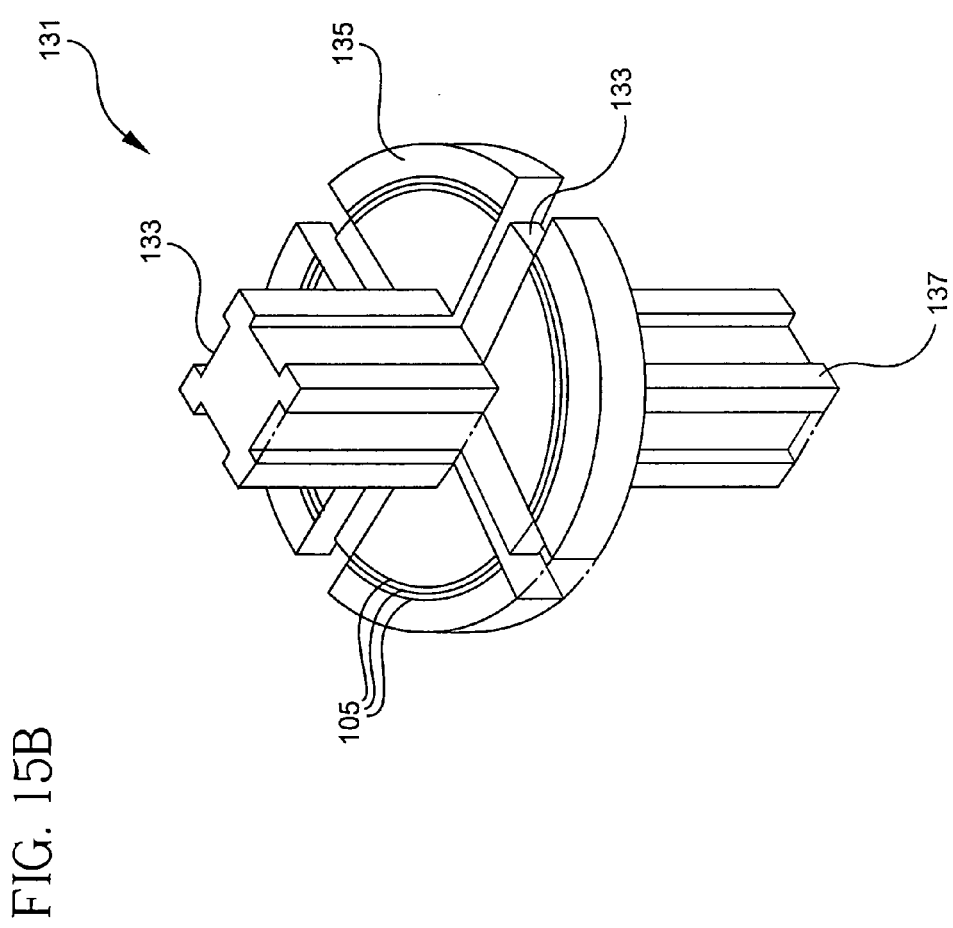

FIG. 15b shows an isometric view of a second embodiment of a unitary molded header 131 for use in the third embodiment of the tilt sensor formed in accordance with the present invention. The second embodiment of the molded header 131 is similar to that shown in FIG. 15a, except that rather than the slots 133 tunneling through the header disk portion 135, the slots 133 are preferably directed and form channels along the outside of the header disk portion 135 as they connect with the slots 133 on opposing sides of the header disk portion 135.

Figure 15C:
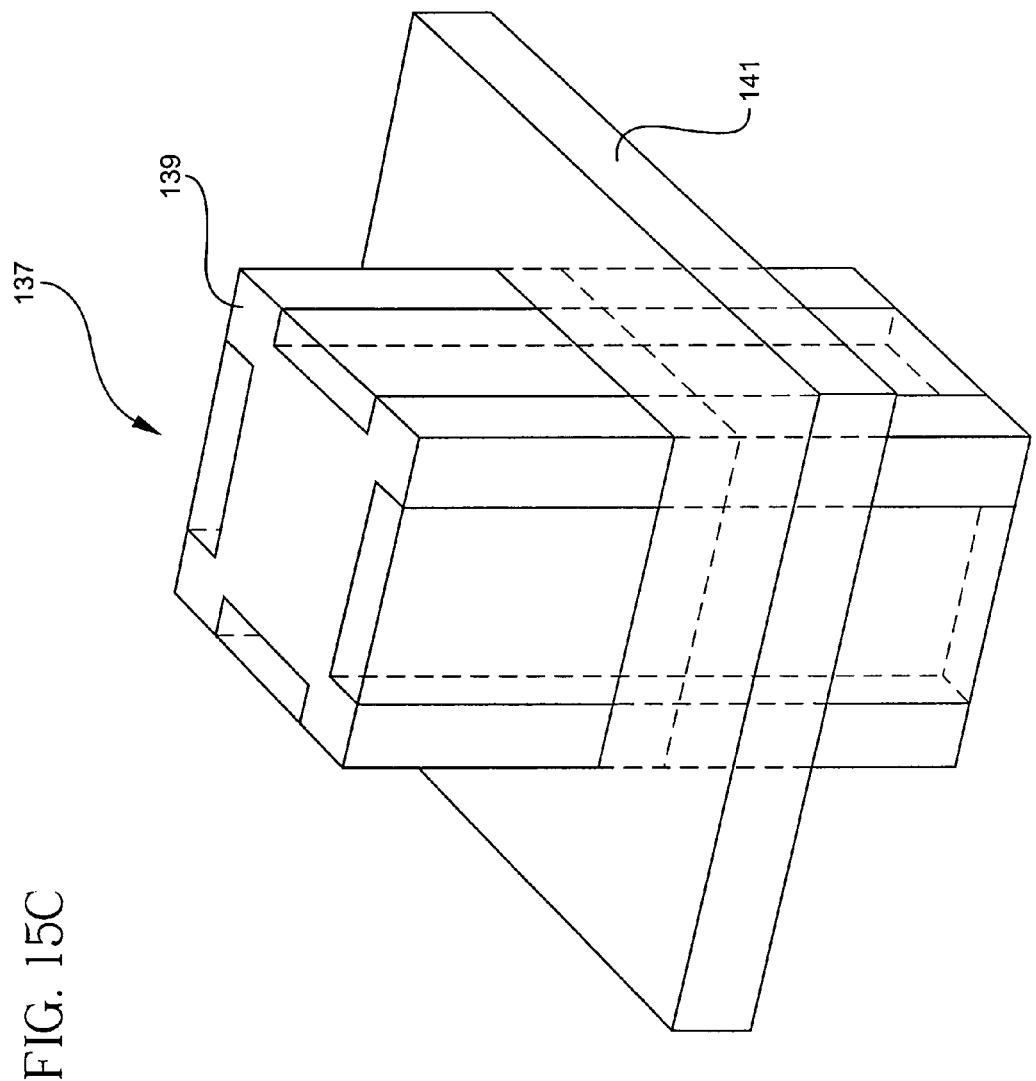

FIG. 15c shows an isometric view of a third embodiment of a unitary molded header 137 for use in the third embodiment of the tilt sensor formed in accordance with the present invention. The third embodiment of the molded header 137 is similar to that shown in FIG. 15a, except that the electrode stud portion 139 and header disk portion 141 are rectangular or square rather than rounded.

Figure 16B:
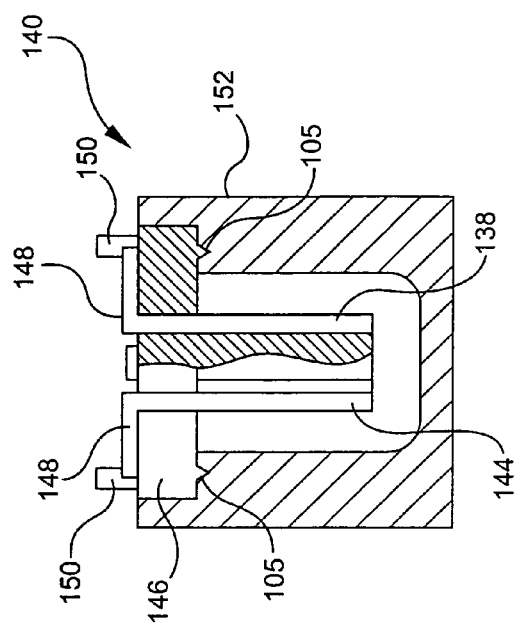
Figure 16A:
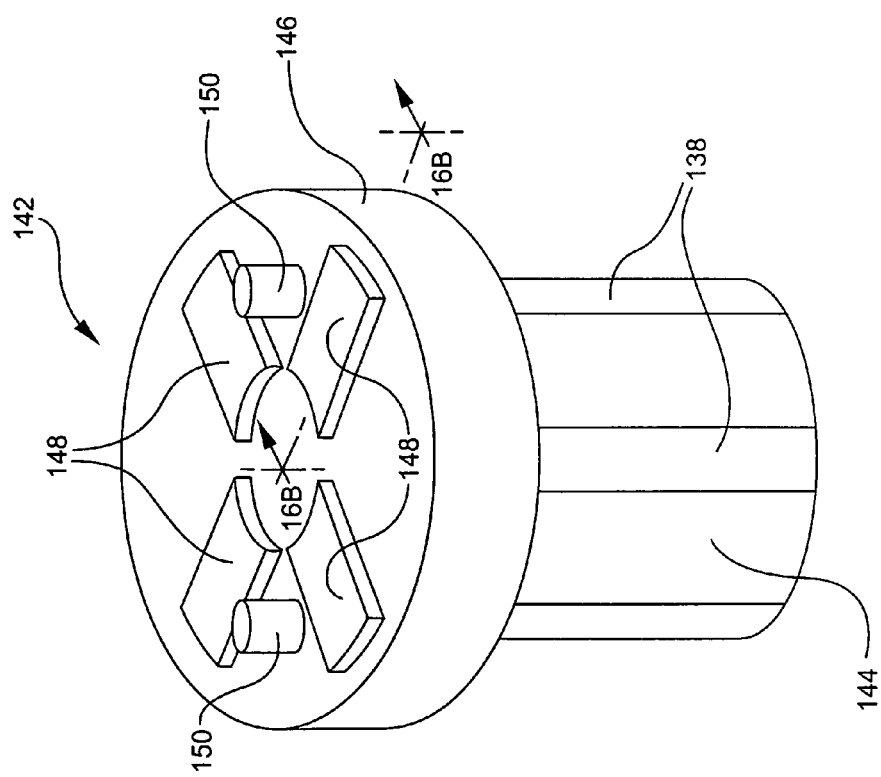

FIG. 16b shows a side cross-sectional view of a fourth embodiment of the tilt sensor 140 formed in accordance with the present invention. FIG. 16a shows a top isometric view of a molded header 142 for use in the fourth embodiment of the tilt sensor 140 shown in FIG. 16b. The fourth embodiment is similar to the third embodiment, except that the molded header 142 includes an electrode stud portion 144 that extends from only one side of the header disk portion 146.

The opposite side of the header disk portion, from which the electrode stud portion 146 does not extend, preferably includes conductive pads 148, which are manufactured from, for instance, conductive PPO® resin, that are electrically connected to each of the conductive traces 138 on the electrode stud portion 144. The header disk portion 146 preferably also includes orientation studs 150 that extend from the face of the header disk portion 146, from which the electrode stud portion 144 does not protrude. The orientation studs 150 are preferably mounted within corresponding apertures in, for instance, a printed circuit board to maintain the alignment of the tilt sensor with respect thereto.

Figure 17B:
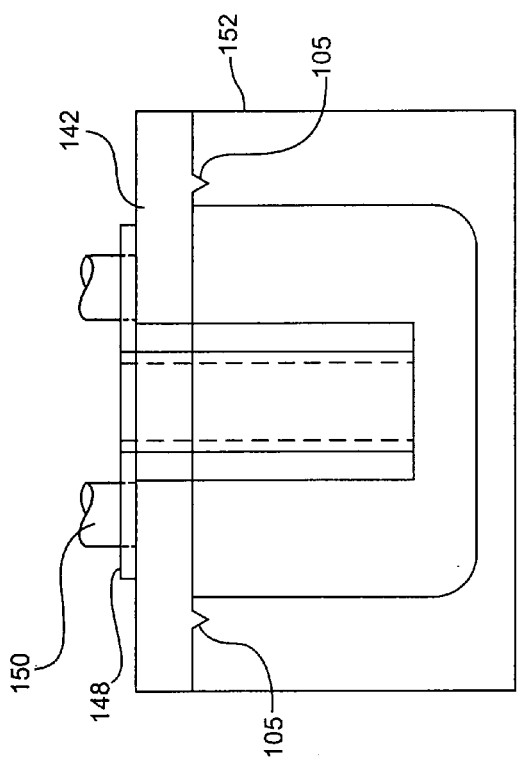
Figure 17A:
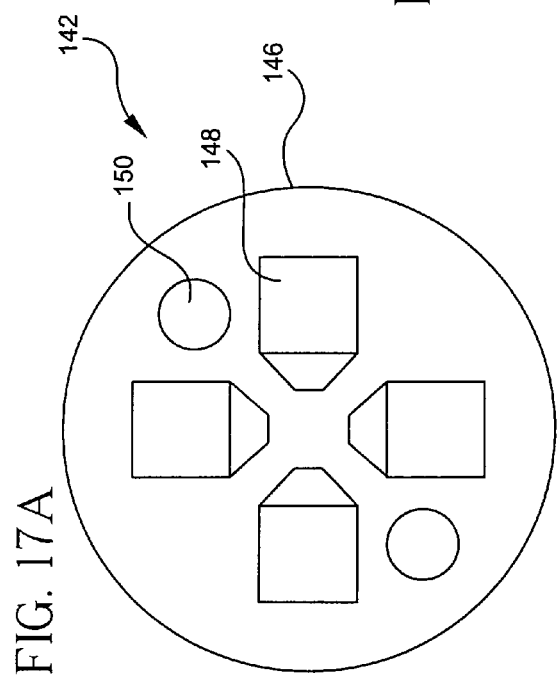
Figure 18B:
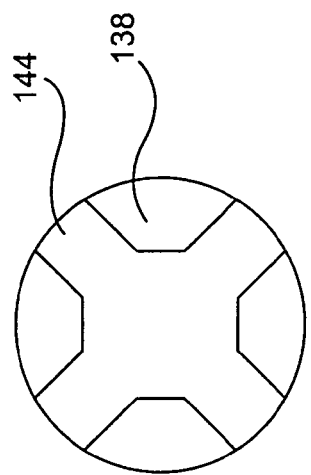
Figure 18A:
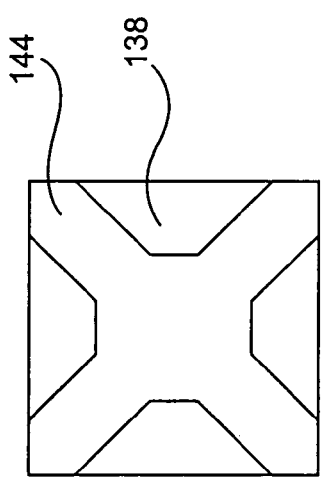

FIG. 16a shows a side cross-sectional view of the molded header 142 mounted within an envelope 152, in which the electrically conductive pads 148 face upwards. FIG. 17a shows a top view of the molded header 142 including the orientation studs 150 and conductive pads 148. FIG. 17b shows a side cross-sectional view of the molded header 142 mounted within the envelope 152. FIGS. 18a and 18b show bottom end views of alternative embodiments for the electrode stud portion 144 shown in FIG. 16a.

FIGS. 19a and 19b show a side cross-sectional view and a top view, respectively, of a fifth embodiment of the tilt sensor 154 formed in accordance with the present invention. The tilt sensor 154 preferably includes an envelope 156 produced by a two-shot molding process. The first shot forms the non-conductive cylindrical envelope 156 having a round hollow chamber that is closed at one end 151 and counter bored at the other end 153. The envelope 156 also preferably includes spaced-apart vertical voids 158 that run the length of the envelope 156. The walls 157 of the envelope 156 are held in place between the voids 158 by their attachment to the closed end 151 of the envelope 156.

The voids 158 preferably form a mold for the second-shot, which includes placement of a conductive material, such as PPO® resin, to fill the spaced-apart voids 158. This preferably forms spaced-apart conductive traces 160 along the inside and outside lengths of the envelope 156. The conductive traces may or may not be selectively plated or metallized. Alternatively, as discussed previously, the electrodes may be formed in the envelope by applying a conductive material thereto in the form of paint, coating, tape, or other suitable method of application known to those of ordinary skill in the art.

The envelope 156 may also include a protruding orientation stud 162 adapted to be inserted into a corresponding aperture in, for instance, a printed circuit board, to maintain the position of the tilt sensor 154 after mounting. As shown in FIG. 19a, the tilt sensor 154 preferably also includes a non-conductive header disk 164 that is sized to fit tightly into the counter bored hole of the envelope 156.

The tilt sensor 154 is preferably assembled by positioning the envelope 156 such that its open end 153 is facing upward. The electrolyte 86 is then preferably injected into the volume defined by the envelope 156 and the cover disk or header disk 164 is forced into and seated onto the shoulder of the counter bored end 153 of the envelope 156. The header disk 164 is then preferably ultrasonically welded around the periphery of the counter bored shoulder to hermetically seal the electrolyte 86 within the envelope 156.

Figure 20A:
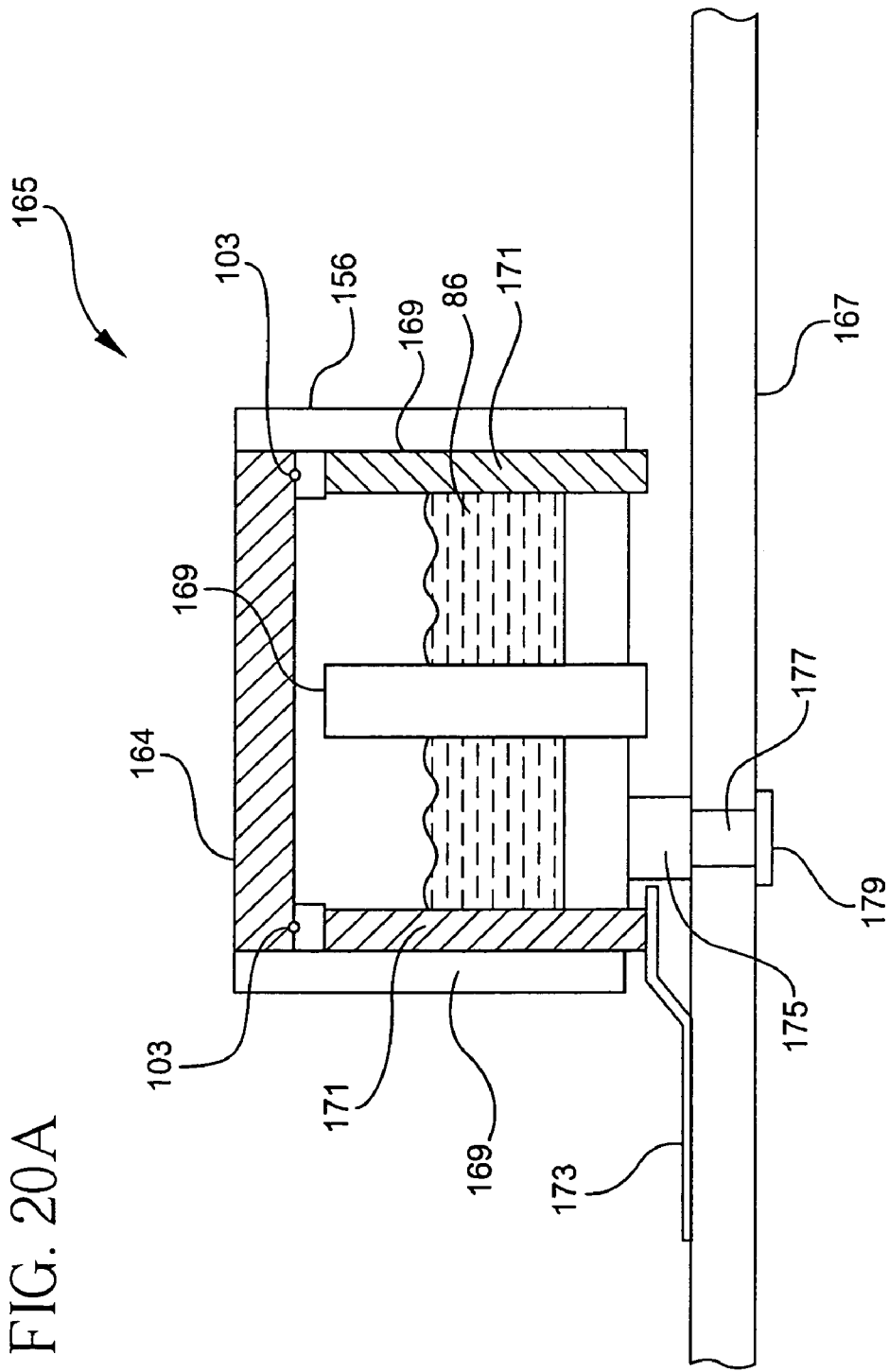
FIGS. 20a and 20b are side cross-sectional views of a fifth embodiment of the tilt sensor formed in accordance with the present invention.

FIG. 20a shows a side cross-sectional view of a sixth embodiment of the tilt sensor 165 mounted to a printed circuit board 167. The tilt sensor 165 is similar to the fifth embodiment, except that the voids of the fifth embodiment have been replaced with slots 169 on an interior surface of the envelope 156 that preferably extend through only a bottom surface of the envelope 156. The slots 169 are preferably filled with conductive material 171 that protrudes from the bottom surface of the envelope 156 to make electrical contact with a contact arm 173 positioned on the board 167.

Figure 20B:
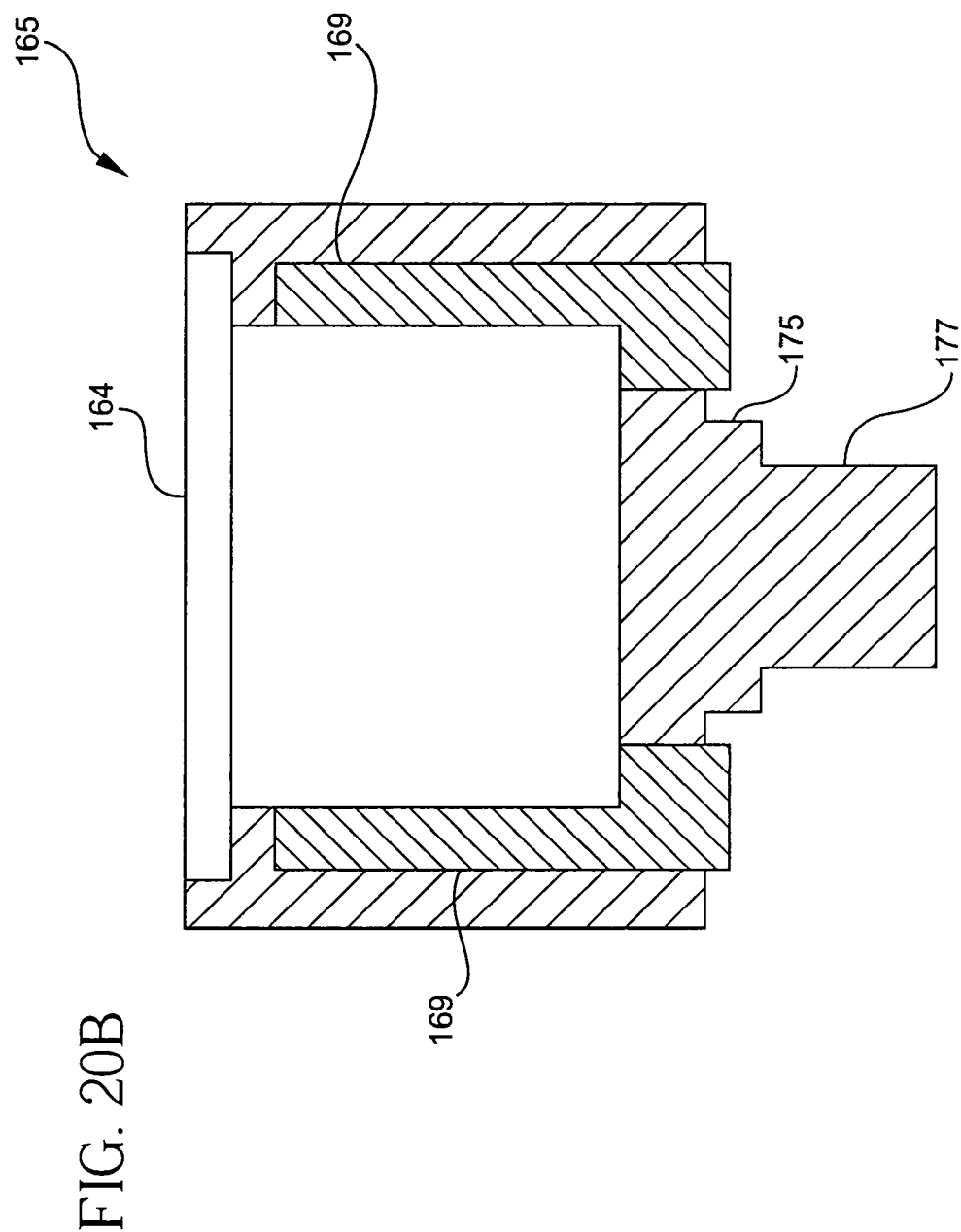

The tilt sensor 165 also differs from the fourth embodiment in that it includes at least one stud 175, which is preferably molded with the envelope 156 and protrudes from the bottom surface thereof. The stud 175 is preferably positioned at the center of the bottom surface of the envelope 156, as shown in FIG. 20b, but may be positioned at any other location thereon, as shown in FIG. 20a, while remaining within the scope of the present invention. Each of the studs 175 includes a reduced portion 177, which is sized to fit through a hole in the printed circuit board 167, such that the tilt sensor 165 is held above the board 167. An end of the reduced portion 177 that extends from the printed circuit board 167 is preferably heated to form a knob 179 thereon, thereby retaining the tilt sensor 165 in its intended position on the board 167. The contact arm 173 is preferably jogged or elevated from the upper surface of the printed circuit board 167 by an amount greater than the distance between the protruding conductive material 171, such that the contact arm 173 is biased against the protruding conductive material 171 to ensure adequate electrical connection therewith.

Figure 21B:
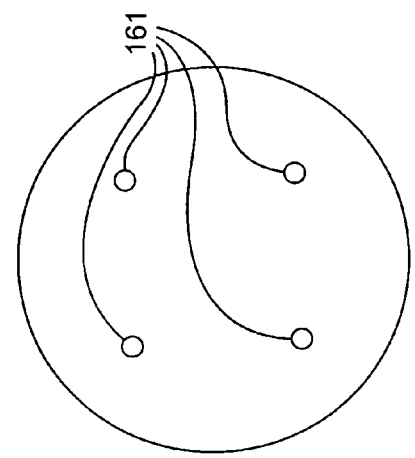
FIGS. 21a and 21b are side and bottom views, respectively, of a sixth embodiment of the tilt sensor formed in accordance with the present invention.
Figure 21A:
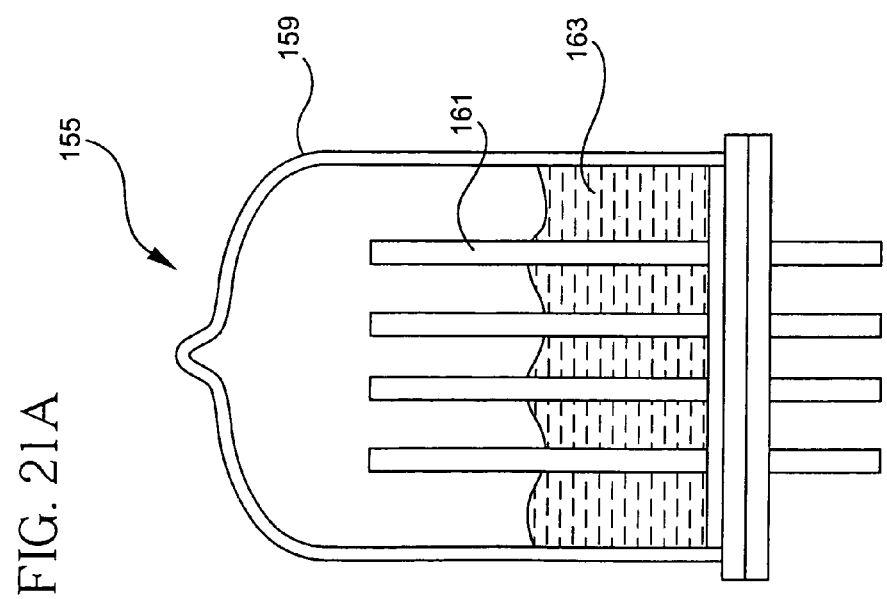

FIGS. 21a and 21b show side and bottom views, respectively, of a sixth embodiment of the four-pin tilt sensor 155 in accordance with the present invention, which includes a glass envelope 159, four (4) wire electrodes 156, and electrolytic fluid 163. The tilt sensor 155 is preferably manufactured by methods well known to those skilled in the art, except that the tilt sensor requires only four (4) electrodes to determine tilt with respect to two axes (as discussed above with respect to the signal conditioning circuits shown in FIGS. 3, 3a, and 4–6.

Thus, the electrolytic tilt sensors formed in accordance with the present invention preferably include one or more of the following features:

1. components of the tilt sensor are formed from plastics and the like which are readily available, and easy to handle and mold, such as, but not limited to PPO® resin, polypropylene, Vectra® (Celanese Corporation, 1211 Avenue of the Americas, New York, N.Y. 10036), Peak® (Peak Technologies, 9200 Berger Road, Columbia, Md., 21046), Ultem® (General Electric Corporation, One Plastics Avenue, Pittsfield, Mass. 01201), or other suitable materials, and epoxy;
2. two-shot molded electrode configurations including a non-conductive first shot to form a base and a conductive second shot to form electrodes, opposing pairs of electrodes being substantially equidistant from each other;
3. electrodes may or may not be selectively metallized;
4. unitary, integral, or multi-component electrode assembly including the electrode stanchion or stud fitted into the header disk and sealed with an epoxy seal having a temperature coefficient of expansion matched with that of the header disk within a service temperature range of interest, or electrodes molded integrally in the walls of the envelope using a two-shot molding process, thereby reducing the tilt sensor to an envelope and header disk;
5. applying the electrodes to the stud or envelope by painting, depositing, and/or taping a conductive material thereto; and
6. envelope filled with an electrolyte of suitable volume and hermetically sealed using any known technique, including an ultrasonic weld, adhesive, epoxy, or heating the components to form a seal.

The tilt sensor embodiments described above are intended as examples without limiting the scope of the present invention in any way, which may incorporate any or all of the features of the exemplary embodiments, as well as the following:

1. an envelope, electrode stud, header disk, and/or seal having a curvilinear or rectangular, which includes square configuration;
2. any or all of the envelope, electrode stud, header disk, and/or seal having the same temperature coefficient of expansion; and
3. application of the conductive material to form electrodes by any process known in the art, such as plating, painting, brushing, adhesive, and the like.

The tilt sensor of the present invention may be mounted to a printed circuit board in any known manner. Several preferred methods for mounting the tilt sensors are shown in FIGS. 22–25. Specifically, FIG. 22a shows a top view of a first embodiment of a tilt sensor connector 166 that includes four (4) contact arms 168, which are adapted to electrically connect the conductive traces 108 on the electrode stud 94 with additional circuitry on, for example, a printed circuit board. FIG. 22b shows a side cross-sectional view of the tilt sensor 118 inserted into the sensor connector 166 and applied to the printed circuit board 170. Each of the contact arms 168 preferably includes a sensor portion 172, which makes contact with one of the conductive traces 108 on the electrode stud 94, and a board portion 174, which makes contact with circuitry on the printed circuit board 170.

The sensor portion 172 and board portion 174 are connected by a length of the contact arm 168 that is preferably positioned along a surface of the printed circuit board 170. The board portion 174 is bent such that it can be inserted into an aperture in the printed circuit board 170 for retention therein by, for example, soldering. The sensor portion 172 is bent or cantilevered such that it exerts a spring-like tension, as indicated by a dotted phantom 173 of the sensor portion 172, to maintain electrical conductivity with the conductive trace 108 when the electrode stud 94 is inserted into the sensor connector 166.

FIG. 23a shows a top view of a second embodiment of a tilt sensor connector 176, which includes four (4) contact arms 178 that are adapted to electrically connect the conductive traces 108 on the electrode stud 94 with additional circuitry on the printed circuit board 170 shown in FIG. 23b. The tilt sensor connector 176 is preferably manufactured and applied to the printed circuit board 170 as a single piece with v-notches 180, which can thereafter be stamped to electrically isolate the contact arms 178 from each other.

FIG. 23b shows a side cross-sectional view of the electrode stud 94 of a tilt sensor mounted in the connector 176, which has been applied to the printed circuit board 170. Each of the contact arms 168 preferably includes a sensor portion 182, which makes contact with one of the conductive traces 108. The sensor connector also includes one or more tabs 184 that are, for example, adapted for being push-fit into holes in the printed circuit board 170 to maintain the orientation of the tilt sensor.

The sensor portion 182 is preferably bent such that it exerts a spring-like tension, as indicated by a dotted phantom 173 of the sensor portion 172, to maintain electrical conductivity with the conductive trace 108 when the electrode stud 94 is inserted into the sensor connector 176. The v-notches 180 are preferably positioned over depressions in the printed circuit board 170 such that when stamped with a minimal amount of force, the quadrants of the sensor connector 176 are electrically isolated from each other.

Figure 24B:
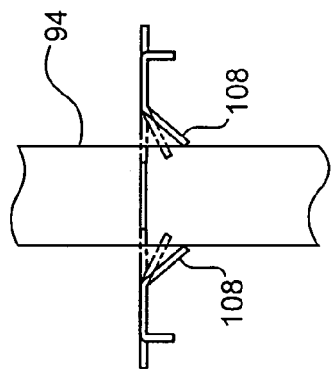
FIGS. 24a and 24b are top and side cross-sectional views, respectively, of a third embodiment of a connector for the tilt sensor formed in accordance with the present invention.
Figure 24A:
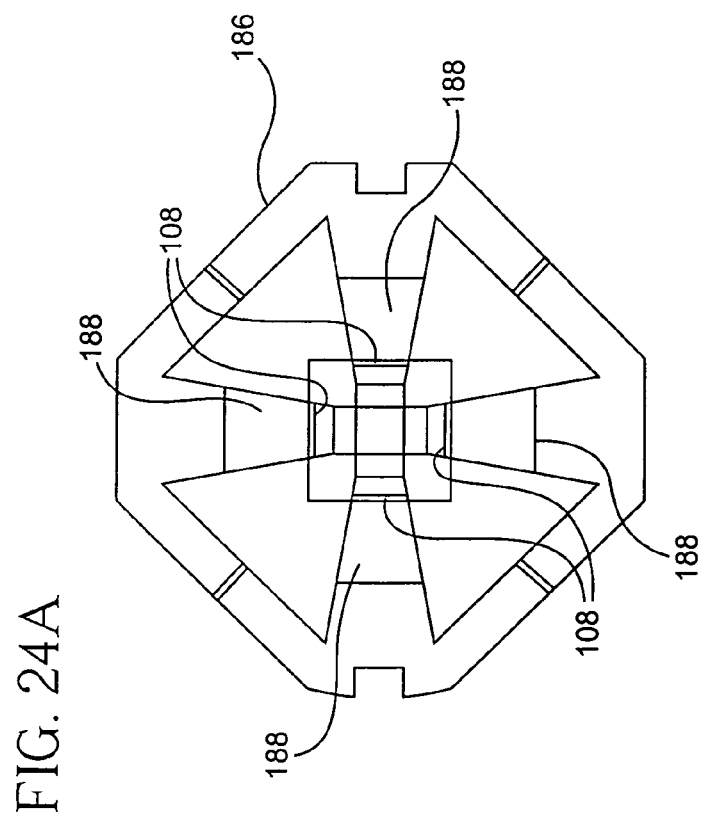

FIG. 24a shows a top view of a third embodiment of a tilt sensor connector 186, which includes four (4) contact arms 188 that are adapted to electrically connect the conductive traces 108 on the electrode stud 94 with additional circuitry. FIG. 24b shows a side cross-sectional view of the electrode stud 94 of a tilt sensor mounted in the connector 186. The third embodiment of the sensor connector 186 is similar to the second embodiment of the sensor connector 176, except that rounded edges in the second embodiment have been replaced by straight edges in the third embodiment.

Figure 25B:
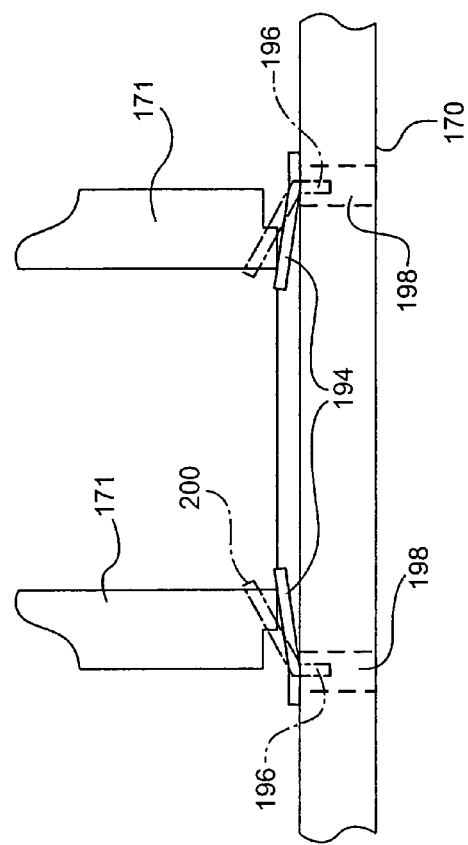
FIGS. 25a and 25b are top and side cross-sectional views, respectively, of a fourth embodiment of a connector for the tilt sensor formed in accordance with the present invention.
Figure 25A:
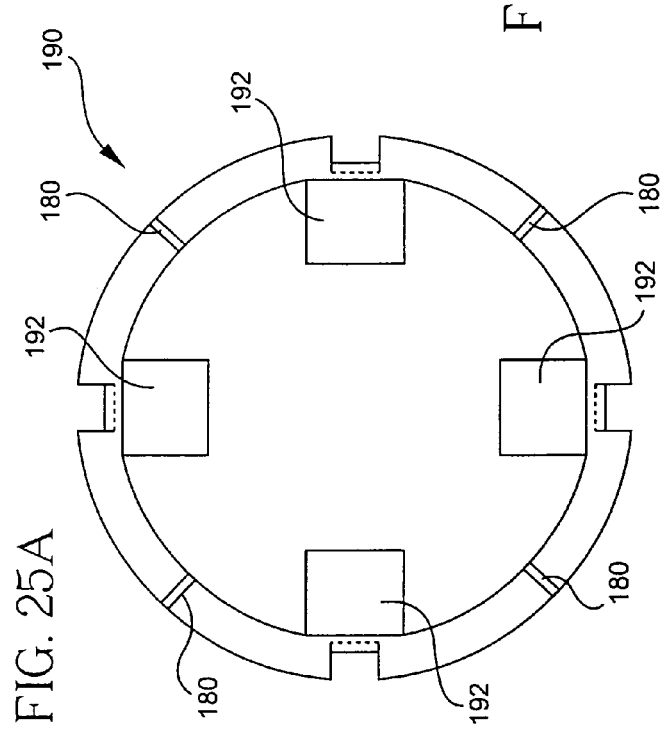

FIG. 25a shows a top view of a fourth embodiment of a tilt sensor connector 190 adapted for use with the sixth embodiment of the tilt sensor 165 shown in FIGS. 20a and 20b. The tilt sensor connector 190 includes four (4) contact arms 192 that are adapted to electrically connect the conductive material 171 protruding from the bottom surface of the envelope 156 with additional circuitry. The tilt sensor connector 190 is preferably manufactured and applied to the printed circuit board 170 as a single piece with v-notches 180, which can thereafter be stamped to electrically isolate the contact arms 192 from each other.

FIG. 25b shows a side cross-sectional view of the tilt sensor 165 mounted in the connector 190. Each of the contact arms 192 preferably includes a sensor portion 194, which makes contact with the protruding conductive material 171. The sensor connector also includes one or more tabs 196 that are, for example, adapted for being push-fit into holes 198 in the printed circuit board 170 to maintain the orientation of the tilt sensor.

The sensor portion 194 is preferably bent such that it exerts a spring-like tension, as indicated by a dotted phantom 200 of the sensor portion 194, to maintain electrical conductivity with the conductive material 171. The v-notches 180 are preferably positioned over depressions in the printed circuit board 170, such that when stamped with a minimal amount of force, the quadrants of the sensor connector 190 are electrically isolated from each other.

The sensor connectors 166, 176, 186 are adaptable to being reel fed and placed onto a printed circuit board, soldered (hand or wave) in place, and, in the case of sensor connectors 176, 186, separated into individual contacts to accept the electrode stud 94. Following insertion of the electrode stud 94 in the sensor connectors 166, 176, 186 the tilt sensor is preferably fixed in place using, for example, an adhesive or laminate.

Therefore, the present invention provides electrolytic tilt sensors that are small, lightweight, rugged, simple, inexpensive to manufacture, applicable by various automated and non-automated mounting processes, and require fewer electrodes than conventional tilt sensors. The subject tilt sensors are also readily adaptable to mass production techniques within acceptable tolerances for use in a variety of different applications.

Although the illustrative embodiments of the present invention have been described herein with reference to the accompanying drawings, it is to be understood that the invention is not limited to those precise embodiments and that various other changes and modifications may be effected therein by one skilled in the art without departing from the scope or spirit of the invention.

What is claimed is:

1. A method of sensing tilt, comprising:
    applying an electrical signal to at least one electrode of a first set of spaced-apart electrodes, the first set of electrodes being disposed in a conductive medium, the conductive medium being disposed in an envelope; and
    measuring a first electrical parameter using at least one electrode of a second set of spaced-apart electrodes, the second set of electrodes being disposed in the conductive medium, the first electrical parameter being responsive to the applied electrical signal and representing an angle of tilt relative to a first axis, such that no more than four electrodes are used to provide electrical parameters representative of angles of tilt relative to two non-parallel axes.

2. The method of sensing tilt defined by claim 1, further comprising:
    reversing electrical roles of the first set of electrodes and the second set of electrodes comprising:
        applying an electrical signal to at least one electrode of the second set of electrodes; and
        measuring a second electrical parameter using at least one electrode of the first set of electrodes, the second electrical parameter being responsive to the applied electrical signal and representing an angle of tilt relative to a second axis.

3. The method of sensing tilt defined by claim 2, further comprising positioning the first set of electrodes and the second set of electrodes such that the first axis is substantially non-parallel with the second axis.

4. The method of sensing tilt defined by claim 1, further comprising spacing apart the first set of electrodes a distance substantially equal to a spacing separating the second set of electrodes.

5. The method of sensing tilt defined by claim 1, wherein the first electrical parameter comprises at least one of voltage, current, resistance, capacitance, impedance, and inductance.

6. The method of sensing tilt defined by claim 1, wherein the conductive medium comprises at least one of an electrolyte and an electrolytic solution.

7. The method of sensing tilt defined by claim 1, wherein applying an electrical signal further comprises applying at least one of a voltage, a current, a substantially constant signal, and a time-varying signal to at least one electrode of the first set of electrodes.

8. The method of sensing tilt defined by claim 1, wherein measuring the first electrical parameter further comprises:
   measuring the first electrical parameter from a first electrode;
   measuring the first electrical parameter from a second electrode; and
   combining the first electrical parameter measured from the first electrode and the second electrode, the combined first electrical parameter representing the angle of tilt relative to the first axis.

9. The method of sensing tilt defined by claim 1, wherein the first set of electrodes comprises two electrodes and the second set of electrodes comprises two electrodes.

10. A tilt sensor, comprising
   an envelope;
   a conductive medium disposed in the envelope; and
   at least four electrodes disposed in the envelope such that at least a portion of each electrode is in contact with the conductive medium, the electrodes being electrically insulated from each other to provide at least a first set of spaced-apart electrodes and at least a second set of spaced-apart electrodes, at least one electrode of at least one of the first set of electrodes and the second set of electrodes being adapted to be selectively connected to an electrical signal, at least one electrode of at least one of the first set of electrodes and the second set of electrodes being adapted to be used to provide an electrical parameter in response to the electrical signal, the electrical parameter being representative of an angle of tilt relative to at least one axis, such that no more than four electrodes are used to provide electrical parameters representative of angles of tilt relative to two non-parallel axes.

11. The tilt sensor defined by claim 10, wherein the first set of electrodes defines a first axis and the second set of electrodes defines a second axis.

12. The tilt sensor defined by claim 11, wherein the first axis is substantially non-parallel with the second axis.

13. The tilt sensor defined by claim 10, further comprising spacing apart the first set of electrodes a distance equal to that of the second set of electrodes.

14. The tilt sensor defined by claim 10, wherein the electrical parameter comprises at least one of voltage, current, resistance, capacitance, impedance, and inductance.

15. The tilt sensor defined by claim 10, wherein the conductive medium comprises at least one of an electrolyte and an electrolytic solution.

16. The tilt sensor defined by claim 10 wherein electrodes in the first set of electrodes are disposed on substantially opposing sides of the envelope.

17. The tilt sensor defined by claim 10, wherein electrodes in the second set of electrodes are disposed on substantially opposing sides of the envelope.

18. The tilt sensor defined by claim 10, wherein the tilt sensor comprises four electrodes.

19. The tilt sensor defined by claim 10, wherein the electrical signal comprises at least one of voltage, current, a substantially constant signal, and a time-varying signal.

20. A tilt sensing system, comprising
   a tilt sensor comprising:
      an envelope;
      a conductive medium disposed in the envelope; and
      at least four electrodes disposed in the envelope such that at least a portion of each electrode is in contact with the conductive medium, the electrodes being electrically insulated from each other to provide at least a first set of spaced-apart electrodes and at least a second set of spaced-apart electrodes, at least one electrode of the first set of electrodes being adapted to be used to provide at least one first electrical parameter, at least one electrode of the second set of electrodes being adapted to be used to provide at least one second electrical parameter, such that no more than four electrodes are used to provide electrical parameters representative of angles of tilt relative to two non-parallel axes; and
   an electrical signal source adapted to be selectively connected to at least one electrode of at least one of the first set of electrodes and the second set of electrodes such that an electrical signal is applied thereto.

21. The tilt sensing system defined by claim 20, further comprising a mixer adapted to combine at least one of the first electrical parameters and the second electrical parameters, the mixer being adapted to provide a tilt parameter representing an angle of tilt relative to at least one axis.

22. The tilt sensing system defined by claim 20, wherein the electrical signal source further comprises a first signal generator and a second signal generator adapted to be connected to electrodes disposed on opposing sides of the envelope.

23. The tilt sensing system defined by claim 20, further comprising a three-state driver adapted to selectively apply the voltage difference to at least one of the first set of electrodes and the second set of electrodes.

24. The tilt sensing system defined by claim 20, wherein the tilt sensor comprises four electrodes.

25. The tilt sensing system defined by claim 20, wherein the electrical signal source is adapted to provide at least one of voltage, current, a substantially constant signal, and a time-varying signal.

26. A method of making a tilt sensor, comprising:
   providing at least four electrodes comprising at least two sets of spaced-apart electrodes, such that no more than four electrodes are used to provide electrical parameters representative of angles of tilt relative to two non-parallel axes;
   forming an envelope adapted to receive at least a portion of the electrodes;
   placing a conductive medium into the envelope; and
   sealing the conductive medium in the envelope to be in contact with at least a portion of each electrode.

27. The method of making a tilt sensor defined by claim 26, wherein forming the electrodes further comprises forming the electrodes on an electrode stud.

28. The method of making a tilt sensor defined by claim 27, further comprising forming the electrode stud comprising a plurality of spaced-apart longitudinal slots, the electrodes being disposed in the slots.

29. The method of making a tilt sensor defined by claim 27, wherein forming the envelope further comprises forming the envelope adapted to receive at least a portion of a header disk, the method further comprising:
   forming the header disk comprising an aperture adapted to receive the electrode stud;
   inserting the electrode stud in the aperture of the header disk; and
   inserting the header disk in the envelope.

30. The method of making a tilt sensor defined by claim 29, wherein sealing the conductive medium in the envelope further comprises at least one of sealing, ultrasonically welding, and curing the header disk in the aperture of the envelope.

31. The method of making a tilt sensor defined by claim 29, further comprising:
    forming a seal; and
    applying the seal around the electrode stud in the aperture of the header disk.

32. The method of making a tilt sensor defined by claim 31, wherein forming the seal further comprises forming the seal to comprise an epoxy.

33. The method of making a tilt sensor defined by claim 31, further comprising forming at least two of the envelope, electrode stud, header disk, and seal to comprise substantially the same temperature coefficient of expansion.

34. The method of making a tilt sensor defined by claim 29, wherein forming the header disk further comprises forming the header disk to comprise at least one of PPO®resin, polypropylene, Vectra®, Peak®, Ultem®, plastic, and resin.

35. The method of making a tilt sensor defined by claim 29, further comprising forming at least two of the envelope, electrode stud, and header disk to comprise substantially the same temperature coefficient of expansion.

36. The method of making a tilt sensor defined by claim 27, further comprising forming a molded header comprising the electrode stud and a header disk integral therewith.

37. The method of making a tilt sensor defined by claim 36, wherein forming the molded header further comprises forming the molded header comprising spaced-apart slots extending through apertures in the header disk.

38. The method of making a tilt sensor defined by claim 36, wherein forming the molded header further comprises forming the molded header comprising spaced-apart slots substantially aligned with spaced-apart slots disposed on an exterior surface of the header disk.

39. The method of making a tilt sensor defined by claim 36, wherein forming the molded header further comprises forming the molded header to comprise at least one of PPO® resin, polypropylene, Vectra®, Peak®, Ultem®, plastic, resin, and epoxy.

40. The method of making a tilt sensor defined by claim 36, further comprising forming at least two of the envelope, electrode stud, and molded header to comprise substantially the same temperature coefficient of expansion.

41. The method of making a tilt sensor defined by claim 40, further comprising:
    applying the conductive medium through the aperture in the raised boss; and
    sealing the aperture in the raised boss.

42. The method of making a tilt sensor defined by claim 27, further comprising forming the electrode stud to comprise at least one of PPO® resin, polypropylene, Vectra®, Peak®, Ultem®, plastic, and resin.

43. The method of making a tilt sensor defined by claim 27, further comprising forming the envelope and electrode stud to comprise substantially the same temperature coefficient of expansion.

44. The method of making a tilt sensor defined by claim 26, wherein forming the electrodes further comprises forming the electrodes on an inner surface of the envelope.

45. The method of making a tilt sensor defined by claim 26, wherein forming the envelope further comprises forming the envelope to comprise at least one of PPO® resin, polypropylene, Vectra®, Peak®, Ultem®, plastic, and resin.

46. The method of making a tilt sensor defined by claim 26, further comprising selectively metallizing the electrodes.

47. The method of making a tilt sensor defined by claim 26, wherein forming the envelope further comprises forming the envelope to comprise a raised boss, the raised boss comprising an aperture therethrough.

48. A tilt sensor, comprising:
    at least four electrodes comprising at least two sets of spaced-apart electrodes, such that no more than four electrodes are used to provide electrical parameters representative of angles of tilt relative to two non-parallel axes;
    an envelope adapted to receive at least a portion of the electrodes;
    a conductive medium sealed in the envelope, the conductive medium being in contact with at least a portion of each electrode.

49. The tilt sensor defined by claim 48, wherein the electrodes are formed on an electrode stud.

50. The tilt sensor defined by claim 49, wherein the electrode stud comprises a plurality of spaced-apart longitudinal slots, the electrodes being disposed in the slots.

51. The tilt sensor defined by claim 49, further comprising a header disk, the envelope being adapted to receive at least a portion of the header disk, the header disk comprising an aperture adapted to receive the electrode stud, the electrode stud being disposed in the aperture of the header disk, the header disk being disposed in the envelope.

52. The tilt sensor defined by claim 51, wherein the header disk is sealed in the envelope.

53. The tilt sensor defined by claim 51, further comprising a seal adapted to form a seal around the electrode stud in the aperture of the header disk.

54. The tilt sensor defined by claim 53, wherein the seal further comprises an epoxy.

55. The tilt sensor defined by claim 53, wherein at least two of the envelope, electrode stud, header disk, and seal comprise substantially the same temperature coefficient of expansion.

56. The tilt sensor defined by claim 51, wherein the header disk comprises at least one of PPO® resin, polypropylene, Vectra®, Peak®, Ultem®, plastic, and resin.

57. The tilt sensor defined by claim 51, wherein at least two of the envelope, electrode stud, and header disk comprise substantially the same temperature coefficient of expansion.

58. The tilt sensor defined by claim 49, further comprising a molded header comprising the electrode stud and a header disk integral therewith.

59. The tilt sensor defined by claim 58, wherein the molded header further comprises spaced-apart slots extending through apertures in the header disk.

60. The tilt sensor defined by claim 58, wherein the molded header further comprises spaced-apart slots substantially aligned with spaced-apart slots disposed on an exterior surface of the header disk.

61. The tilt sensor defined by claim 58, wherein the molded header further comprises at least one of PPO® resin, polypropylene, Vectra®, Peak®, Ultem®, plastic, resin, and epoxy.

62. The tilt sensor defined by claim 58, wherein at least two of the envelope, electrode stud, and molded header comprise substantially the same temperature coefficient of expansion.

63. The tilt sensor defined by claim 49, wherein the electrode stud comprises at least one of PPO® resin, polypropylene, Vectra®, Peak®, Ultem®, plastic, and resin.

64. The tilt sensor defined by claim 49, wherein the envelope and electrode stud comprise substantially the same temperature coefficient of expansion.

65. The tilt sensor defined by claim 48, wherein the electrodes are formed on an inner surface of the envelope.

66. The tilt sensor defined by claim 48, wherein the envelope comprises at least one of PPO® resin, polypropylene, Vectra®, Peak®, Ultem®, plastic, and resin.

67. The tilt sensor defined by claim 48, wherein the electrodes are selectively metallized.

68. The tilt sensor defined by claim 48, wherein the envelope comprises a raised boss, the raised boss comprising an aperture therethrough the aperture in the raised boss being adapted to place the conductive medium therethrough.

69. The tilt sensor defined by claim 48, wherein the tilt sensor comprises four electrodes.

70. The tilt sensor defined by claim 48, further comprising means for connecting the tilt sensor to a circuit board, the connecting means comprising cantilevered contact arms adapted to connect the electrodes to conductive portions of the circuit board.

71. The tilt sensor defined by claim 70, wherein the contact arms are initially connected to each other and adapted for separation following application to the circuit board.

72. The tilt sensor defined by claim 48, wherein the envelope comprises a stud adapted for mounting the tilt sensor to a circuit board.

73. The tilt sensor defined by claim 48, wherein the electrodes comprise voids disposed on an interior surface of the envelope, the voids being at least partially filled with conductive material.

* * * * *